(12) United States Patent
Mizutani et al.

(10) Patent No.: US 6,731,621 B1
(45) Date of Patent: May 4, 2004

(54) MOBIL COMMUNICATION SYSTEM FOR PROVIDING IP PACKET COMMUNICATIONS AND METHOD FOR ROUTING IP PACKETS

(75) Inventors: Mika Mizutani, Tokyo (JP); Susumu Matsui, Machida (JP); Toshiya Ouchi, Tokyo (JP); Haruo Shibata, Yokohama (JP); Koji Hirayama, Chigasaki (JP); Keisuke Shirai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/261,181

(22) Filed: Mar. 3, 1999

(30) Foreign Application Priority Data

Jun. 4, 1998 (JP) .......................... 10/155857

(51) Int. Cl.$^7$ ............................... H04Q 7/24
(52) U.S. Cl. ................... 370/338; 370/331; 370/401; 455/433; 455/432.3; 455/435.1
(58) Field of Search ................. 370/331–401; 455/432, 433, 435, 446, 554, 556, 557, 435.1, 432.1, 432.3

(56) References Cited

U.S. PATENT DOCUMENTS 5,590,133 A * 12/1996 Billstrom et al. ........... 370/332
6,091,951 A *  7/2000 Sturniolo et al. ......... 455/432 X
6,266,523 B1 *  7/2001 Cook et al. ............. 455/554 X

FOREIGN PATENT DOCUMENTS

| EP | 0483547 | 5/1992 |
| EP | 0578041 | 1/1994 |
| EP | 0766490 | 4/1997 |
| JP | A-9-326805 | 12/1997 |
| WO | 9746036 | 12/1997 |
| WO | 9800986 | 1/1998 |
| WO | 9815143 | 4/1998 |

OTHER PUBLICATIONS

A. Fieger, et al, Migration Support for Indirect Transport Protocols, Institute of Operation Systems and Computer Networks Technical University of Braunschweig, Germany, 1997 IEEE pp. 898–902.
J. Hansen, et al, Semi–Connected TCP/IP in a Mobile Computing Environment, Department of Computer Science, University of Copenhagen, Denmark, pp 1–4.
RFC2002, Aug. 29, 1997, pp. 1–39.
GSM 03.60, especially §6.9, "Location Management Function", pp. 40–48 and Annex A1, pp. 86–87.
RFC2002, Aug. 29, 1997, pp. 1–39.
"NITT DoCoMo Technical Journal", vol. 5, No. 2, Jul., 1997, "Overview of Service (Service Name: DoPa)" on p. 7.
GSM 03.60, especially §6.9, "Location Management Function", pp. 40–48 and Annex A1, pp. 86–87.
R. Geiger, "Wireless Network Extension Using Mobile IP", IEEE Micro, Nov./Dec. 1997, pp. 63–66.

* cited by examiner

Primary Examiner—Nay Maung
Assistant Examiner—Philip J. Sobutka
(74) Attorney, Agent, or Firm—Antonelli, Terry, Stout & Kraus, LLP

(57) ABSTRACT

A plurality of packet gate ways (PGWS) are connected between a mobile communication system and an internet so that the corresponding IP subnetworks to those PGWs may be built. A visitor location register (VLR) operates to notify the PGW of location information of the mobile station (MS) and an IP address of a data terminal connected with the MS. If the notified IP address belongs to another IP subnetwork, the PGW notifies the corresponding PGW to that IP subnetwork of a fact that the local PGW is a destination. The PGW operates to manage the location information of the MS connected with the data terminal based on the notified content and perform the packet routing based on the managed content.

15 Claims, 24 Drawing Sheets

FIG. 3

| IP ADDRESS | LOCATION INFORMATION | DESTINATION PGW ADDRESS |
|---|---|---|
| IP ADDRESS OF DATA TERMINAL 112a CONNECTED WITH MS#A | RADIO CELL #A | IP ADDRESS OF PGW #B |
| IP ADDRESS OF DATA TERMINAL 112c CONNECTED WITH MS#C | ... | ... |
| ... | | |

302 / 303 / 304

301 HOME PACKET ROUTING TABLE

FIG. 4

| IP ADDRESS | LOCATION INFORMATION |
|---|---|
| IP ADDRESS OF DATA TERMINAL 112d CONNECTED WITH MS#D | RADIO CELL #B |
| ⋮ | ⋮ |

401 VISITOR PACKET ROUTING TABLE

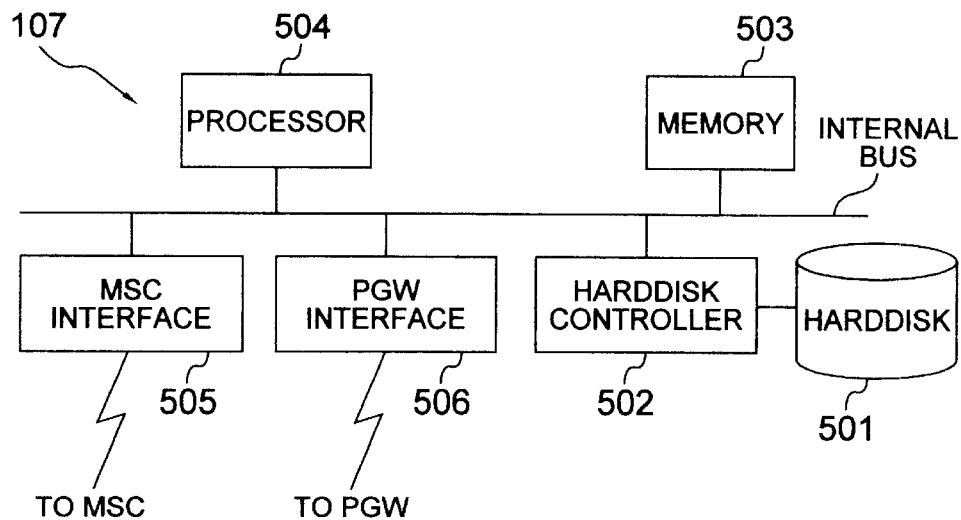

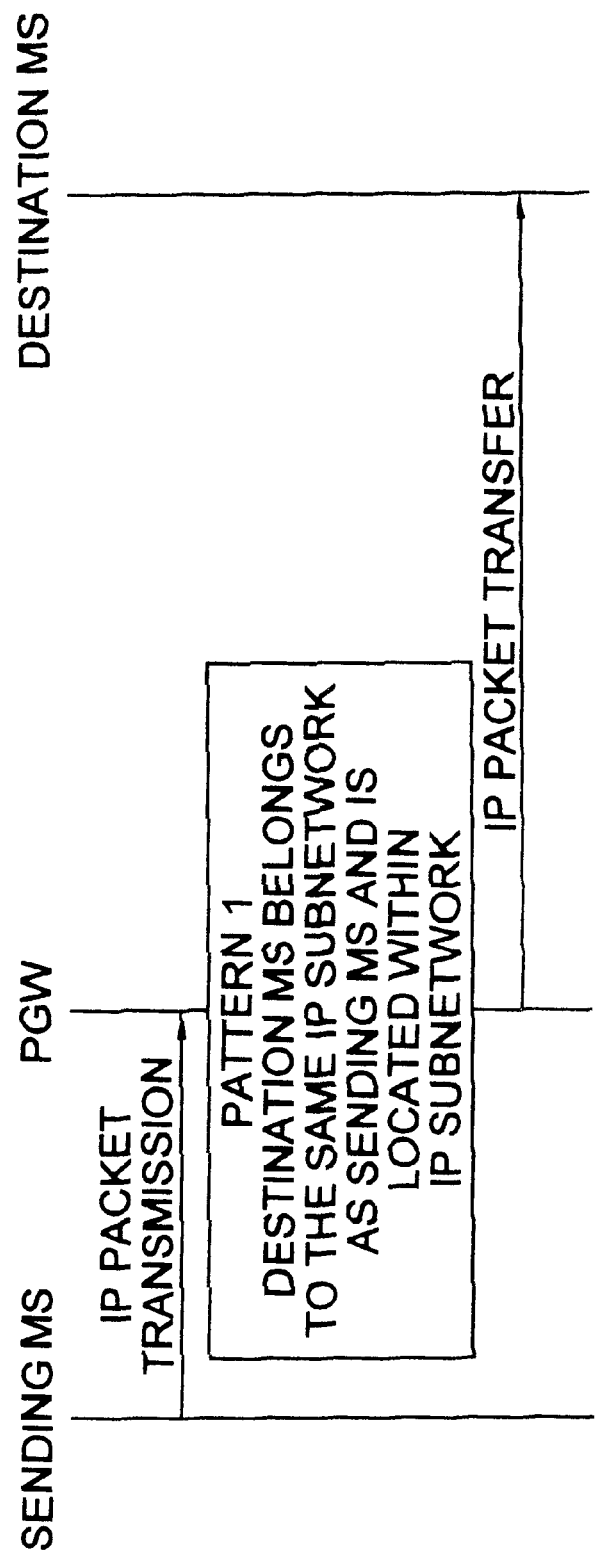

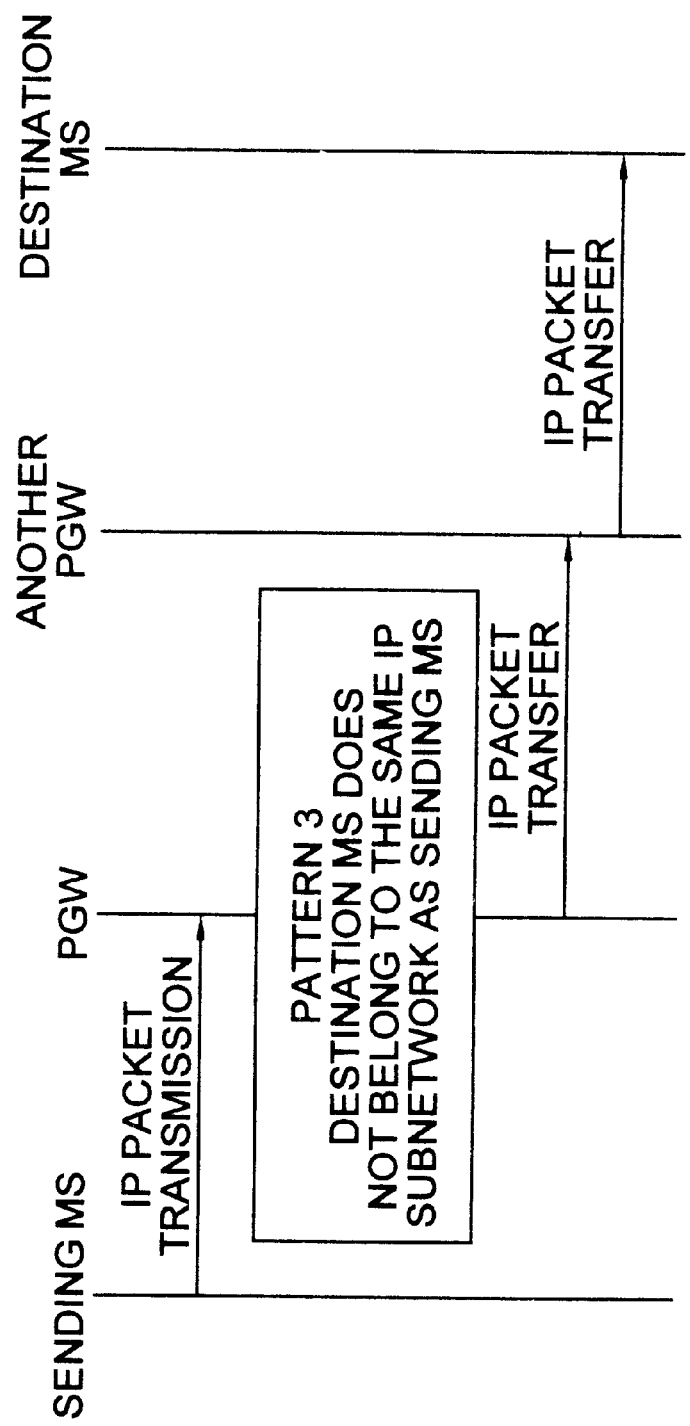

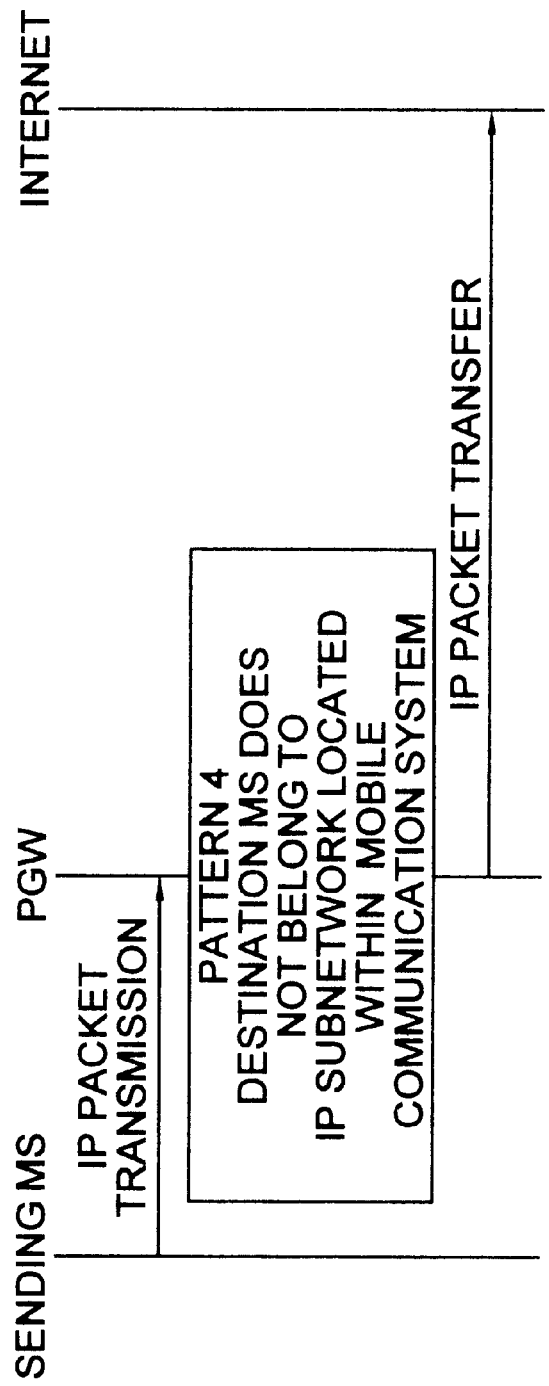

MOBIL COMMUNICATION SYSTEM FOR PROVIDING IP PACKET COMMUNICATIONS AND METHOD FOR ROUTING IP PACKETS

BACKGROUND OF THE INVENTION

The present invention relates to a mobile communication system arranged to provide IP packet communications, and more particularly to a method for routing IP packets which allows any data terminal for doing IP packet communications between IP networks to keep itself in communication without changing an IP address allocated to it.

A mobile communication system, represented as a cellular phone system, has been mainly used as phones. In parallel, the mobile communication system is being increasingly implemented as the use of a short message with data communications. With recent prevail of a data terminal such as a note-sized personal computer to be easily carried and increase of functions of a mobile station such as a mobile phone, a request has been rising for connecting a mobile station to an IP network such as a LAN in an enterprise or an internet.

Under this condition, a packet communication (DoPa) system of 28.8 Kbps has started in a personal digital cellular (PDC) on March 1997 in Japan. This system is standardized as PDC mobile packet communication system (PDC-P) by the ARIB (Association of Radio Industries and Businesses) and as described in "Overview of PDC-P System", NTT DoCoMo Technical Journal, vol. 5, No. 2, July 1997, pp. 6–9.

The system is mainly used for connecting with an in-house LAN and an internet provider. The data terminal has an IP address for supporting a fixed address and a dynamic address. The supported fixed address enables the PDC to use an in-house private address.

The PDC system may accommodate lots of in-house LANs and providers. However, it limits a connecting destination of each mobile station (end user) to a pre-registered network. That is, the connecting point of the mobile station in the in-house LAN or the internet provider is fixed. The data terminal may directly use the application running on the IP, so that in the PDC it uses a protocol called the PPP (Point-to-Point Protocol) on the transfer protocol inside of the PDC network for realizing transfer of the IP packets.

On the other hand, the mobile IP regulated in the standards advisory document Network Working Group RFC (Request for Comments): 2002, by C. Perkins, IETF (Internet Engineering Task Force), Aug. 29, 1997, pp. 1–59 has been proposed for the purpose of realizing the movement transparent IP communication. The mobile communication system such as a cellular system uses an identifier of a mobile station or a user for managing movement of the mobile station. On the other hand, the mobile IP has a home agent function and a foreign agent for each subnetwork. The mobile IP manages the movement of an IP address of a data terminal connected to the mobile station, for realizing transfer of IP packets in an end-to-end manner.

The mobile IP manages the movement with the IP address of the fixed data terminal as a base, while the system for wirelessly transferring packets as disclosed in JP-A-9-326805 is executed to assign the corresponding IP address to a destination wireless system to each data terminal without assigning the fixed IP address to each data terminal. This disclosure has further proposed a system for managing the assigned IP address in correspondence to the mobile station connected with the data terminal or a user identifier in a home network to which the data terminal belongs and obtaining an IP address of a destination from the home network when transferring data.

The mobile communication system may implement a transfer rate of 384 Kbps as a minimum rate in a wide range environment by means of a new wide-band access technique at a radio frequency of 2 GHz. In the indoor environment, the system may implement a transfer rate of 2 Mbps as a maximum rate. This indicates the implementation of fast data communications in this mobile communication system. Accordingly, it is presumed that the user's request for the mobile communication system is gradually changed from fast internet access to transfer of multimedia data, transfer of real-time video data, and then a virtual private network. The data communication is hence indispensable to the mobile communication system.

In the near future, the technical and social position of the data communication is changed from an additional service to a phone system to the corresponding service to the phone system itself, so that more persons are likely to use the data communication. In particular, the connection with the internet is an essential function to the packet data communication service.

In the PDC-P system, each mobile station (end user) has the corresponding fixed route to the in-house LAN or the internet. Hence, the PDC-P system has a first problem that it limits the access to the IP network and has difficulty in entering the global roaming.

As a second problem, if a mobile IP is applied to the existing mobile communication system, the PDC-P system is required to perform the double methods, that is, the existing method for managing movement of a mobile station and a new method for managing movement of a data terminal with an IP address. This means an increase of an overhead in managing movement of a mobile station.

Today, the internet is mainly used for send and receive of mails and access to the World Wide Web. In coming several years, the internet will be newly used for information distribution by the push technique or download of an application from an object store server. In particular, about the information distribution, attention should be paid to the change of the data transfer process from the current data terminal initiative to the coming network initiative.

Considering these ways of use, the system for assigning to each data terminal the corresponding IP address to the destination, as proposed in JP-A-9-326805, has the following problems. If the data transfer is started from the network, the access to the home network is required for obtaining the IP address of the data terminal. Hence, the system disclosed in JP-A-9-326805 is required to solve the problem for reducing an overhead burdened in retrieving the IP address as well as obtaining the latest IP address of the terminal from a fixed IP network such as the internet.

SUMMARY OF THE INVENTION

It is therefore an object of the present invention to provide implementation of IP packet transfer through an efficient route in a mobile communication system.

It is a further object of the present invention to provide implementations of IP packet transfer based on the existing management of movement in a mobile communication system and start of the packet transfer enabled by a network.

According to a feature of the present invention, plural contacts are provided between the mobile communication system and the IP network. The connection of the mobile communication system at each of the contacts is executed by a packet gate way having a router function so that an area of the mobile communication system is arranged of plural IP subnetworks in correspondence to the packet gate ways located inside of the mobile communication system.

According to another feature of the present invention, a request for registering a location of a mobile station includes an IP address of a data terminal connected to the mobile station. A visitor location register manages both the location information of the mobile station and the IP address of the data terminal connected with the mobile station. Together with it, an area of the mobile communication system is divided into plural IP subnetworks so that the location information of the mobile station and the IP address of the data terminal connected to the mobile station are notified to the corresponding packet way to the IP subnetwork where the mobile station is located (IP subnetwork containing a radio cell where the mobile station is located).

According to another feature of the present invention, the packet gate way manages the IP address and the location information notified from the visitor location register. If the notified IP address does not belong to the corresponding IP subnetwork to the packet gate way, the packet gate way (home packet gate way) corresponding to the IP subnetwork where the notified IP address belongs is identified. The notified IP address and the IP address of the packet gate way (that corresponds to the destination packet gate way as viewed from the home packet gate way) are notified to the identified home packet gate way.

According to another feature of the present invention, when receiving the IP packet, the packet gate way compares the IP address of the sending destination with the IP address managed by the packet gate way itself in correspondence to the location information. If the packet gate way itself manages the IP address that matches to the received IP address, the IP packet is transferred on the corresponding location information to the IP address. As a result of the comparison, if the received IP packet is determined to be the IP packet destined for the data terminal connected to the mobile station moved to the corresponding IP subnetwork to another packet gate way, the IP packet is transferred to the destination packet gate way.

According to another feature of the invention, plural packet gate ways are connected between the mobile communication system and the IP network. Hence, the corresponding IP subnetworks to the packet gate ways may be built in the mobile communication system.

In this type of mobile communication system, the send and receive of IP packets to and from the data terminal connected to the mobile station is executed by the corresponding packet gate way to the IP subnetwork where the mobile station is located. Considering the increase of the users of the data communication in the near future, the transfer of IP packets may be implemented through an efficient route.

According to another feature of the invention, the request for registering a location of the mobile station contains the IP address of the data terminal connected to the mobile station. This results in implementing the transfer of IP packets based on the existing management of the movement of the mobile communication system. Further, since the IP address may be fixed to each data terminal, the packet transfer may be started by the network initiative.

BRIEF DESCRIPTION OF THE DRAWINGS

FIG. 3 is a table showing a home packet routing table located in a cache memory of a managing unit of the packet gate way (PGW) included in the first embodiment;

FIG. 4 is a table showing a visitor packet routing table located in a cache memory of a managing unit of the packet gate way (PGW) included in the first embodiment;

FIG. 5 is a block diagram showing hardware of a visitor location register (VLR) included in the first embodiment;

FIG. 6 is a table showing a terminal location managing table for managing the visitor location register (VLR) included in the first embodiment;

FIGS. 14A to 14D are views showing sequences for four possible packet routings in the packet gate way (PGW) if an IP packet is received from the mobile station (MS);

DESCRIPTION OF THE PREFERRED EMBODIMENTS

Hereafter, the present invention will be described along the embodiments with reference to the appended drawings.

At first, the description will be oriented to a first embodiment of the present invention with reference to FIGS. 1 to 19.

Figure 1:
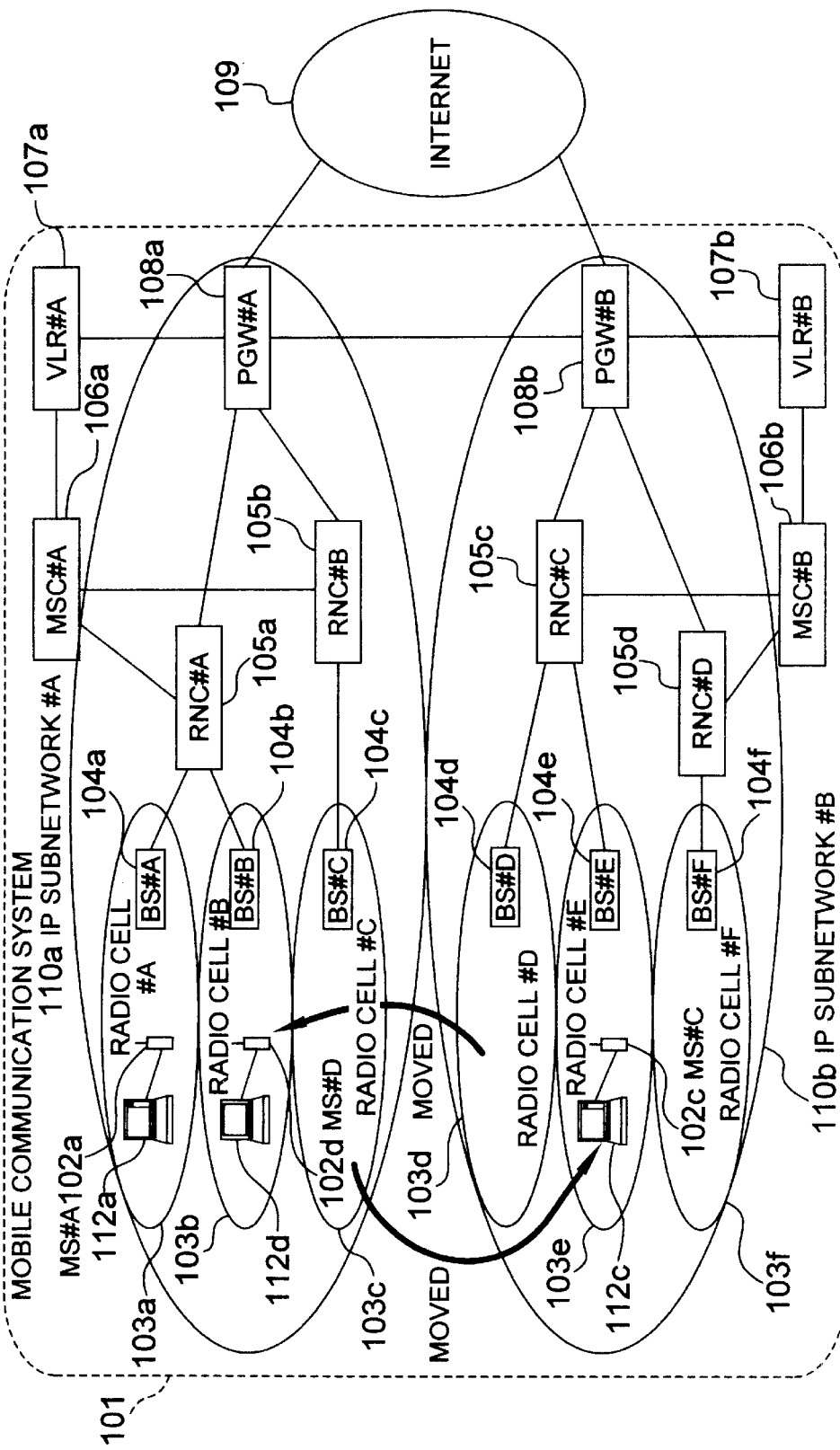
FIG. 1 is a diagram showing an arrangement of a mobile communication system according to a first embodiment of the present invention.

FIG. 1 shows an arrangement of a mobile communication system included in the first embodiment of the invention.

As shown in FIG. 1, a mobile communication system 101 holds a plurality of mobile stations (each of which is referred to as an MS) 102. The mobile communication system 101 includes a base station (referred to as a BS) 104 for sending and receiving a signal to and from the MS 102 located inside of a service area called a radio cell 103, a radio network controller (referred to a RNC) 105 for systematically managing these BS's 104, and a plurality of mobile switching center (referred to as a MSC) 106 connected to the RNC 105 and for composing a mobile station core network.

The mobile station core network provides various kinds of services including end-to-end call control, additional services, management of movement, and connection with a fixed network such as a PSTN (Public Switched Telephone Network).

In FIG. 1, as the components of the mobile station core network, only a visitor location register (referred to as a VLR) 107 concerned with the present invention is shown except the MSC 106. The VLR 107 is served for managing the movement of mobile terminals. Herein, the arrangement has a one-to-one correspondence between the VLR 107 and the MSC 106. The VLR 107 is normally served to manage the location information of the mobile station. In this invention, however, the VLR 107 is served to manage the correspondence between an IP (for example, a phone number) of the mobile station and a data terminal 112 connected to the mobile station.

As shown in FIG. 1, the mobile communication system 101 according to the first embodiment is connected to an internet 109 that corresponds to the IP network through a plurality of packet gate ways (referred to PGWs) 108 each of which has a router function for the IP network and a packet routing function inside of the mobile communication system 101.

The PGW 108 is connected to the VLR 107 and plural RNCs 105 as well as another PGW 108. This connecting arrangement enables the overall service area as a mobile communication system having plural BS's 104 controlled by the RNCs 105 connected to one PGW 108 to build up one IP subnetwork 110.

In FIG. 1, one mobile communication system 101 provides two PGW #A (108a) and PGW #B (108b) and thereby forms two IP subnetwork #A (110a) and IP subnetwork #B (110b) for these PGWs.

In FIG. 1, the BS 104 is located under the control of the RNC 105. The RNC 105 may receive a signal from the MS 102 located inside of one radio cell 103. Both the BS 104 and the RNC 105 correspond to the foregoing device for configuring a radio cell.

Figure 2:
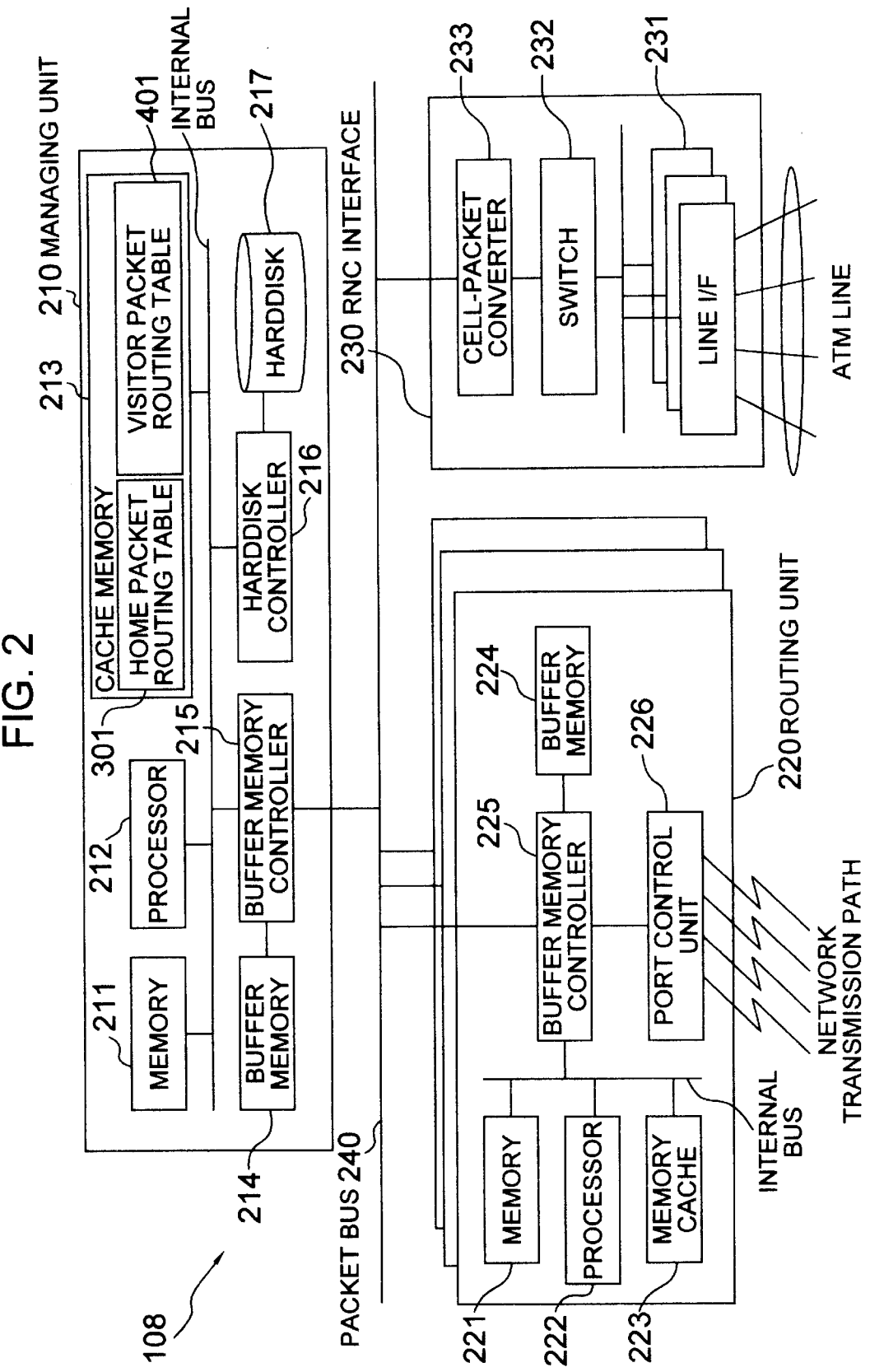
FIG. 2 is a block diagram showing hardware of a packet gate way (PGW) included in the first embodiment.

FIG. 2 shows a hardware diagram of PGW 108.

In FIG. 2, the PGW 108 is arranged to have one or more routing units 220 and an RNC interface 230. Each of those components are connected through a packet bus 240.

As shown in FIG. 2, a managing unit 210 includes a processor 212, a memory 211 for storing a program to executed by the processor 212, a cache memory 213 for storing a packet routing table to be discussed below, a buffer memory 214 for storing packets, a buffer memory controller 215, a harddisk controller 216, and a harddisk 217.

The processor 212 operates to collect the routing information and update the latest routing table by executing the program stored in the memory 211. At a time, the processor 212 also operates to collect the information of the MS 102 located in the IP subnetwork 110 of the mobile communication system 101 and then update the packet routing table. Further, the processor 212 operates to do a packet routing process of transferring IP packets between the internet 109 and the IP subnetwork 110 based on the packet routing table by executing the program stored in the memory 211.

Further, the buffer memory controller 215 operates to do a DMA (Direct Memory Access) transfer of packets to a cell-packet converter 233 included in the RNC interface unit 230 and control a packet bus 240.

Moreover, as shown in FIG. 2, the routing unit 220 includes a processor 222, a memory 221 for storing a program to be executed by the processor 222, a buffer memory 224, and a buffer memory controller 335. In addition, the routing unit 220 has a cache memory 223 for storing a routing table required for fast retrieval and a port controller 226 for connecting to another router or the like.

The processor 222 executes the program stored in the memory 221. According to the program, the processor 222 performs a routing process of selecting the most approximate route on the internet 109 based on the routing table.

In FIG. 2, one port controller 226 serves to support four ports. In the first embodiment, these four ports are used for connecting with another PGW 108.

As shown in FIG. 2, the RNC interface unit 230 serves to connect plural RNCs 105 with the VLR 107 through an ATM line and includes a plurality of line I/Fs 231, a switch 232 for switching ATM lines, and a cell-packet converter 233.

In the first embodiment, a permanent virtual circuit (referred to as a PVC) for fixedly connecting with a destination is set between the VLR 107 and the PGW 108. Between the PGW 108 and each BS 104, each PVC is set through the RNC 105. The transfer of IP packets between the BS 104 and the PGW 108 is executed on this PVC.

FIGS. 3 and 4 show the packet routing tables located in the cache memory 213 included in the managing unit 210 of the PGW 108.

The packet routing table is a table used for managing the moving information of the data terminal 110 (in actual, the MS 102 connected with the data terminal 112) inside of the IP subnetwork 110 and between the IP subnetworks 110. FIG. 3 shows a home packet routing table 301 for managing the location information of the MS 102 connected with the data terminal 112 having the IP address belonging to the local IP subnetwork 110, while FIG. 4 shows a visitor packet routing table 401 for managing the location information of one or more MS's 102 located in the local IP subnetwork, selected among the MS's 102 each of which has the data terminal having the IP address that does not belong to the local IP subnetwork 110.

As shown in FIG. 3, the home packet routine table 301 is arranged to have an IP address 302 of the data terminal to which the local IP subnetwork 110 belongs, the location information (for example, the radio cell identifier) 303 for indicating the radio cell located in the local IP subnetwork 110 if the MS 102 connected with the corresponding data terminal 112 is located in the local IP subnetwork 110, and an IP address (destination PGW address) 304 of the PGW 108 for managing another IP subnetwork 110 if the MS 102 connected with the corresponding data terminal 112 is being moved to the IP subnetwork 110.

FIG. 3 shows an example of a home packet routing table 301 in the PGW #A (108a). The MS #A (102a) connected with the data terminal 112a having the IP address 302 belonging to the local IP subnetwork #A (110a) is located in the radio cell #A (103a). The MS #C (102c) connected with the data terminal 112c having the IP address 302 belonging to the local IP subnetwork #A (110a) is being moved to another IP subnetwork #B (110b) managed by the PWG #B (108b).

As shown in FIG. 4, the visitor packet routing table 401 is composed of the IP address 302 of the data terminal 112 connected to the MS 102 that does not belong to the local IP subnetwork 110 and the location information 303 for indicating the radio cell 103 at which the MS 102 connected to the data terminal 112 is located in the local IP subnetwork 110.

FIG. 4 shows an example of the visitor packet routing table in the PGW #A (108a). The MS #D (102b) connected with the data terminal 112d having the IP address that does not belong to the local IP subnetwork #A (110a) is located in the radio cell #B (103b) in the local IP subnetwork #A (110a).

FIG. 5 is a diagram showing the hardware of the VLR 107.

As shown in FIG. 5, the VLR 107 includes a harddisk 501 for holding the location information and the subscriber's information of the MS 102, a harddisk controller 502, a memory 503 for storing a program for managing the location information and the subscriber's information of the MS 102, a processor 504 for executing this program, an MSC interface 504 through which the VLR 107 is connected to the MSC 106, and a PGW interface 506 through which the VLR 107 is connected with the PGW 108. Those components are connected with each other through an internal bus.

In the first embodiment, the PGW interface 506 of the VLR 107 is connected to the ATM line.

FIG. 6 shows a terminal location managing table managed by the VLR.

As shown in FIG. 6, the terminal location managing table 601 is a table for managing the information of each MS 102 located in the visitor area managed by the VLR 107. The table 601 is held in the harddisk 501 of the VLR 107 and is sequentially rewritten along the movement of the MS 102.

The terminal location managing table 601 is composed of a mobile station user ID (theoretically, for example, a phone number of the mobile station) 602, the IP address 302 of the data terminal 112 connected with the MS 102, and the location information (for example, the radio cell identifier) 303 for indicating the radio cell 103 where the MS 102 is located.

FIG. 6 shows an example of the mobile station location managing table 601 located in the VLR #A (107a). The MS #A (102a) to which the mobile station user ID 602 referred to as "TMUI#A" is assigned is located in the radio cell #A (103a). The MS #B (102b) to which the mobile station user ID 602 referred to as "TMUI#B" is assigned is located in the radio cell #B (103b).

The first embodiment is arranged on the supposition that the mobile communication system 101 is a next-generation mobile communication system ITM-2000 (International Mobile Telecommunication 2000). From a view of safety, in order to avoid transmission of proper information to the MS 102 in the radio interval, the VLR 106 operates to assign the mobile station user ID (TMUI: Temporary Mobile User Identity) 602 to each MS 102 so that the MS 102 may be identified on the mobile station user ID 602 as will be discussed below.

Hereafter, the description will be oriented to a procedure for registering the location and a procedure for transferring packets in the first embodiment.

In the first embodiment, when a certain MS 102 issues a request for registering the location to the VLR 107, the VLR 107 rewrites the location information 303 of the mobile station location information table 601. As a feature of the invention, the rewritten location information 303 is transmitted to the PGW 108 for managing the IP subnetwork 110 containing the radio cell 103 indicated by the location information 303 itself. In response, the PGW 108 having received the rewritten location information 303 operates to update the packet routing table 601 based on the location information 303 transmitted from the VLR 107, for realizing the packet send from the MS 102 or the packet receive in the MS 102.

Figure 7:
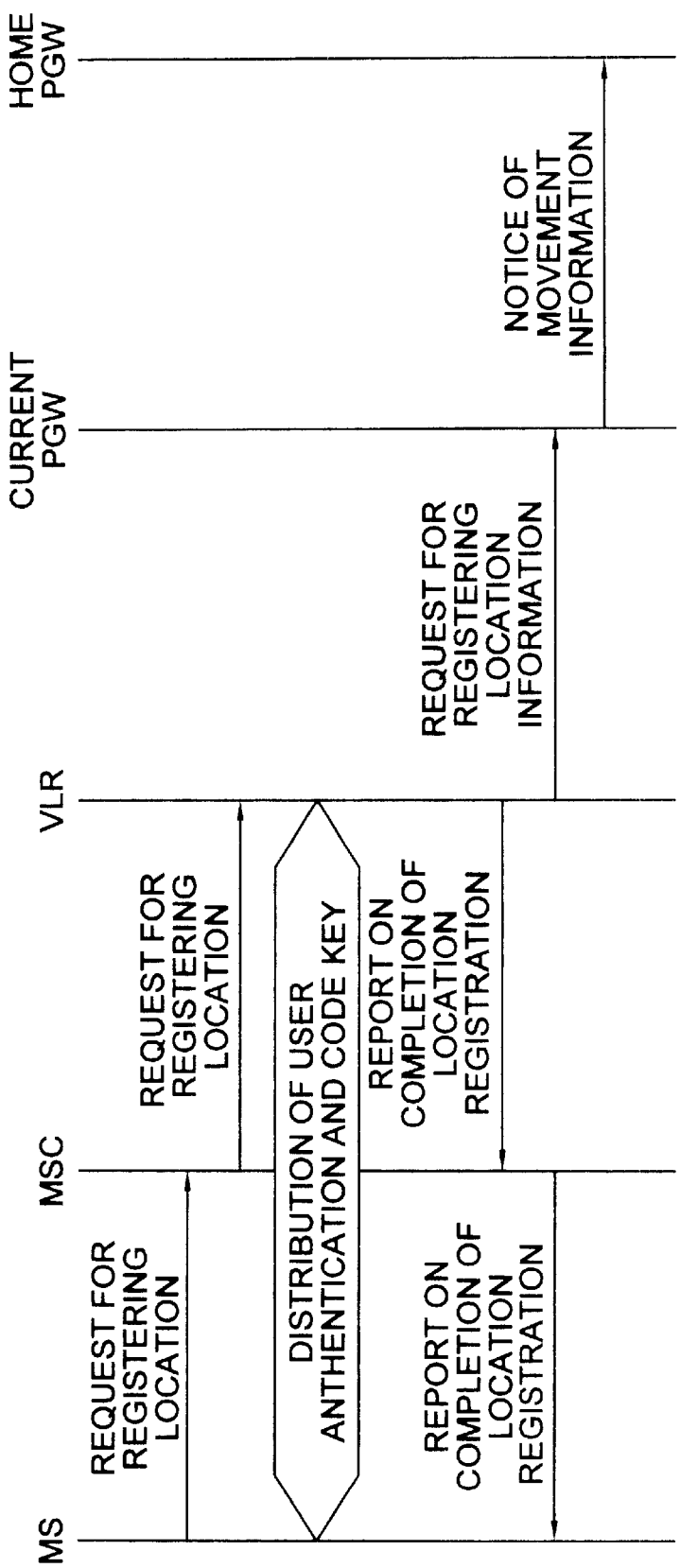
FIG. 7 is a view showing a sequence for registering a location of a mobile station (MS) included in the first embodiment.

FIG. 7 shows the sequence of registering the location of the MS 102.

As shown in FIG. 7, the process for registering the location is started when the MS 102 sends the request for registering the location to the MSC 106 through the BS 104. In the first embodiment, the request for registering the location, which is sent from the MS 102, contains the mobile station user ID 602 and the IP address 302 of the data terminal 112 connected to the MS 102. Herein, the mobile station user ID 602 is obtained by the previous process for registering the location or for updating the location as will be discussed below.

When the MSC 106 receives a request for receiving the location from the MS 102, the MSC 106 operates to transmit the request for registering the location with the location information 303 of the MS 102 added thereto to the VLR 107 to the VLR 107 corresponding to the MSC 106 itself.

Herein, the content of the process of receiving the request for registering the location executed by the VLR 107 will be described with reference to the flowchart of FIG. 8.

When the VLR 107 receives a request for registrating the location from the MSC 106, the VLR 107 performs the process of receiving the request for registering the location.

Figure 8:
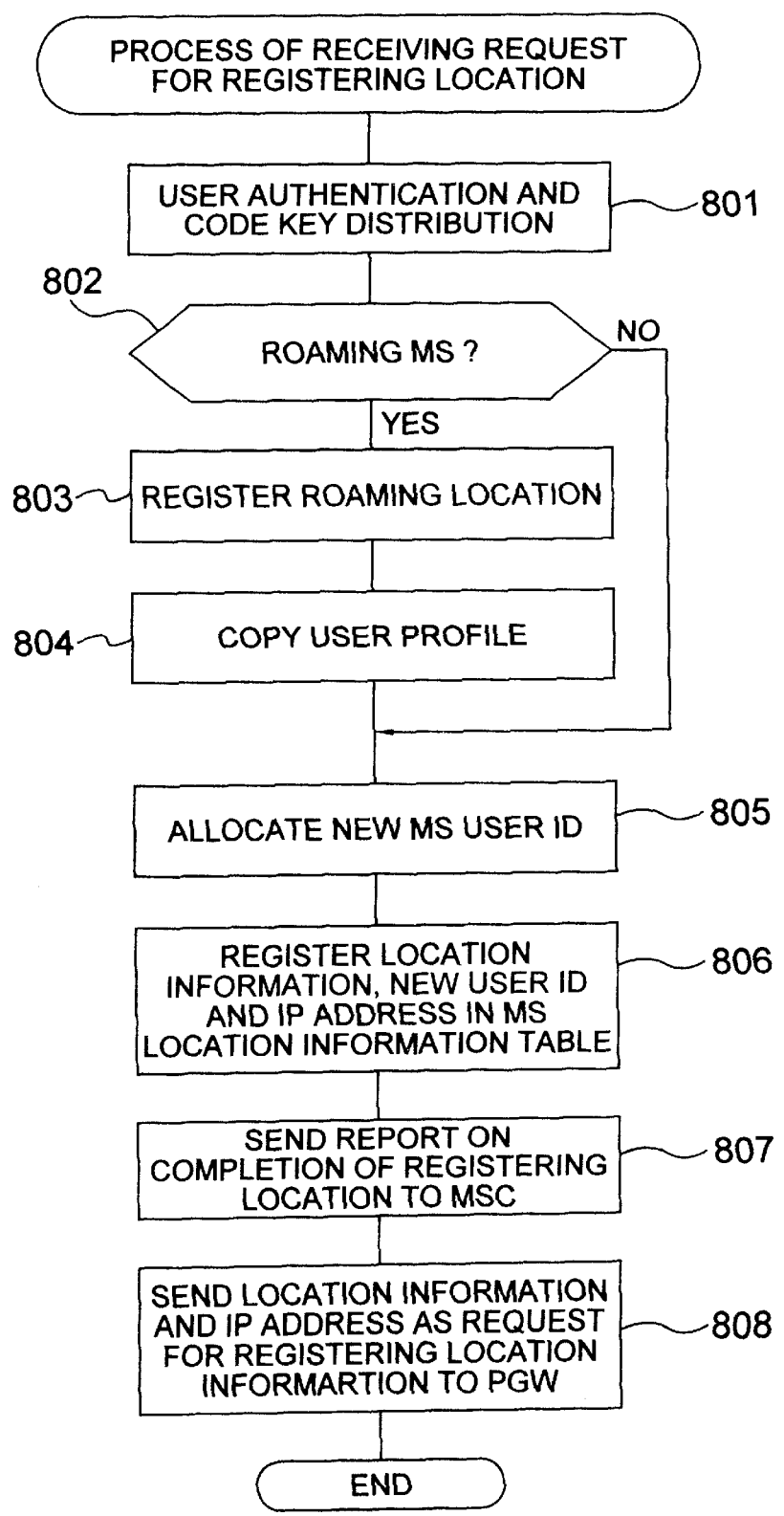
FIG. 8 is a flowchart showing a process for receiving a location registering request to be executed by the visitor location register (VLR) included in the first embodiment.

As shown in FIG. 8, in the process of receiving the request for registering the location, the VLR 107 operates to distribute a user authentication and a code key to the MS 102 having requested the registration (step 801).

Then, the VLR 107 determines whether or not the MS 102 is the roaming MS (that is, the MS managed by another VLR) based on the mobile station user ID 602 (step 802). If it is the roaming MS, the MS 102 operates to register the roaming location to the VLR (home location register of the MS 102) 107 that is managing the location information and the subscriber's information of the MS 102 (step 803). The user profile of the MS 102 is copied from the VLR 107 to the MS 102 itself (step 804).

In succession, the VLR 107 operates to assign a new mobile station user ID 602 to the MS 102 (step 805). Then, the VLR 107 registers the location information 303 of the MS 102 contained in the received request for registering the location, the IP address 302 of the data terminal 112 connected to the MS 102 itself, and the new mobile station user ID 602 assigned at the step 805 in the mobile station location information table 601 (step 806).

Then, as shown in FIG. 7, the VLR 107 operates to register to the MSC 106 a report about completion of registering the location containing the new mobile station user ID 602 (step 807). This enables the report about completion of registering the location to be sent from the MSC 106 to the MS 102. The MS 102 can obtain the new mobile station user ID 602 from the report. Further, the VLR 107 operates to send to the corresponding PGW 108 to this VLR 107 the request for registering the location information containing the location information 303 and the IP address 302 so that the packet routing through the PGW 108 is made possible (step 808). If the MS 102 is moved from another IP subnetwork, the PGW 108 having received the registration of the location information is served to transmit the information to the PGW in the home area to which the MS 102 belongs.

In the first embodiment, as mentioned above, since the request for registering the location transmitted from the MS 102 to the MSC 106 is arranged to have the IP address 302 of the data terminal 112, the VLR 107 can obtain the IP address 302 of the MS 102. In place, however, the VLR 107 can obtain the IP address 302 from another component such as the mobile station user ID 602 without putting the IP address 302 in the request for registering the location. For example, the VLR 107 operates to pass the mobile station user ID 602 as a key to the home location register 107 that corresponds to the VLR where the MS 102 belongs so that the VLR 107 may be given back the IP address 302 of the data terminal 112 connected to the mobile station 102.

Figure 9:
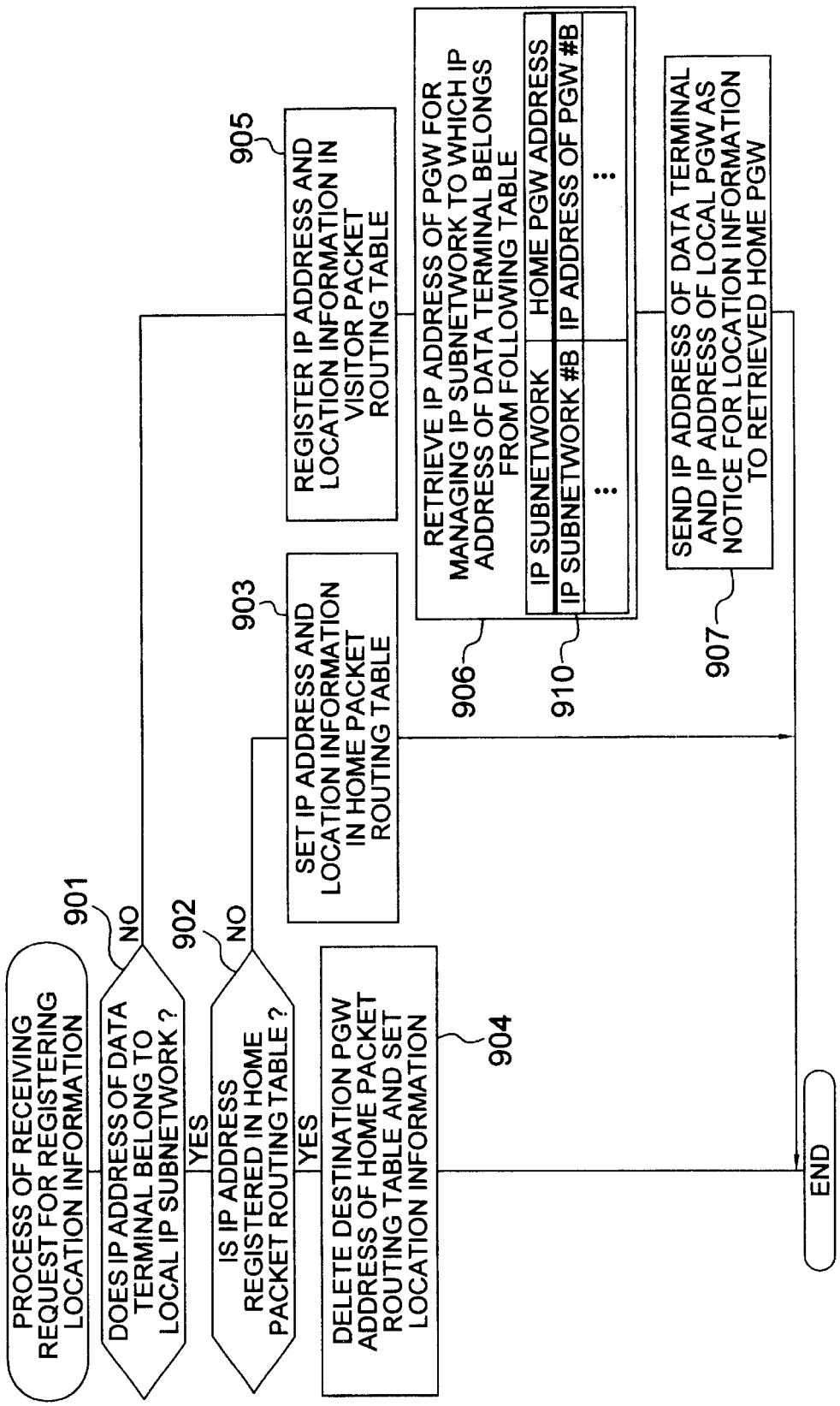
FIG. 9 is a flowchart showing a process for receiving a request for registering location information to be executed by the packet gate way (PGW) included in the first embodiment.

In turn, the description will be oriented to the content of the process of receiving the request for registering the location, executed by the PGW 108, with reference to the flowchart of FIG. 9.

When the PGW 108 receives the request for registering the location information from the VLR 107, the PGW 108 performs the process of receiving the request for registering the location information shown in FIG. 9.

As shown in FIG. 9, in the process of receiving the request for registering the location information, the PGW 108 determines whether or not the IP address 302 contained in the received request for registering the location information belongs to the IP subnetwork 110 managed by the PGW 108 itself (step 901). If it belongs to the IP subnetwork 110 managed by the PGW 108 itself, it is checked if the IP address 302 is registered in the home packet routing table 301 (step 902). If not registered, the IP address 302 and the location information 303 contained in the received request for registering the location information are registered in the home packet routing table 301 (step 903).

If the IP address 302 is pre-registered in the home packet routing table 301 (step 902), it indicates that the MS 102 connected with the data terminal 112 having the IP address 302 is temporarily moved to another IP subnetwork 110 and then returned to the location IP subnetwork 110. Hence, the operation is executed to delete the destination PGW address 304 corresponding to the IP address 302 of the home packet routing table 301 and, instead, set the location information 303 contained in the received request for registering the location information (step 904).

Further, if the IP address 302 contained in the received request for registering the location information belongs to another IP subnetwork 110 (step 901), the PGW 108 operates to register to the visitor packet routing table 401 the IP address 302 of the relevant data terminal 112 and the location information 303 of the relevant MS 103 contained in the received request for registering the location information (step 905).

Moreover, the PGW 108 operates to retrieve the home PGW 108 for managing the IP subnetwork 110 belonging to the IP address 302 from a table 910 in which the IP address of the IP subnetwork 110 to be extracted from the IP address 302 is located in correspondence to the IP address of the PGW 108 for managing the IP subnetwork 110 (step 906).

As shown in FIG. 7, the PGW 108 operates to send the IP address 302 of the data terminal 112 connected to the MS 102 having issued the request for registration and the IP address of the PGW itself (that corresponds to the destination PGW address 304 for the home PGW 108 obtained as a retrieving result) as a notice for moving information to the home PGW 108 obtained as the retrieving result (step 907).

In the first embodiment, the routing unit 220 of the PGW 108 is served to connect the relevant PGW 108 with another PGW 108. At the step 907, the notice for moving information is sent from the port control unit 226 of the local PGW 108 to the home PGW 108 in the form of the IP packet whose destination address is the IP address of the PGW 108 obtained as the retrieving result.

Figure 10:
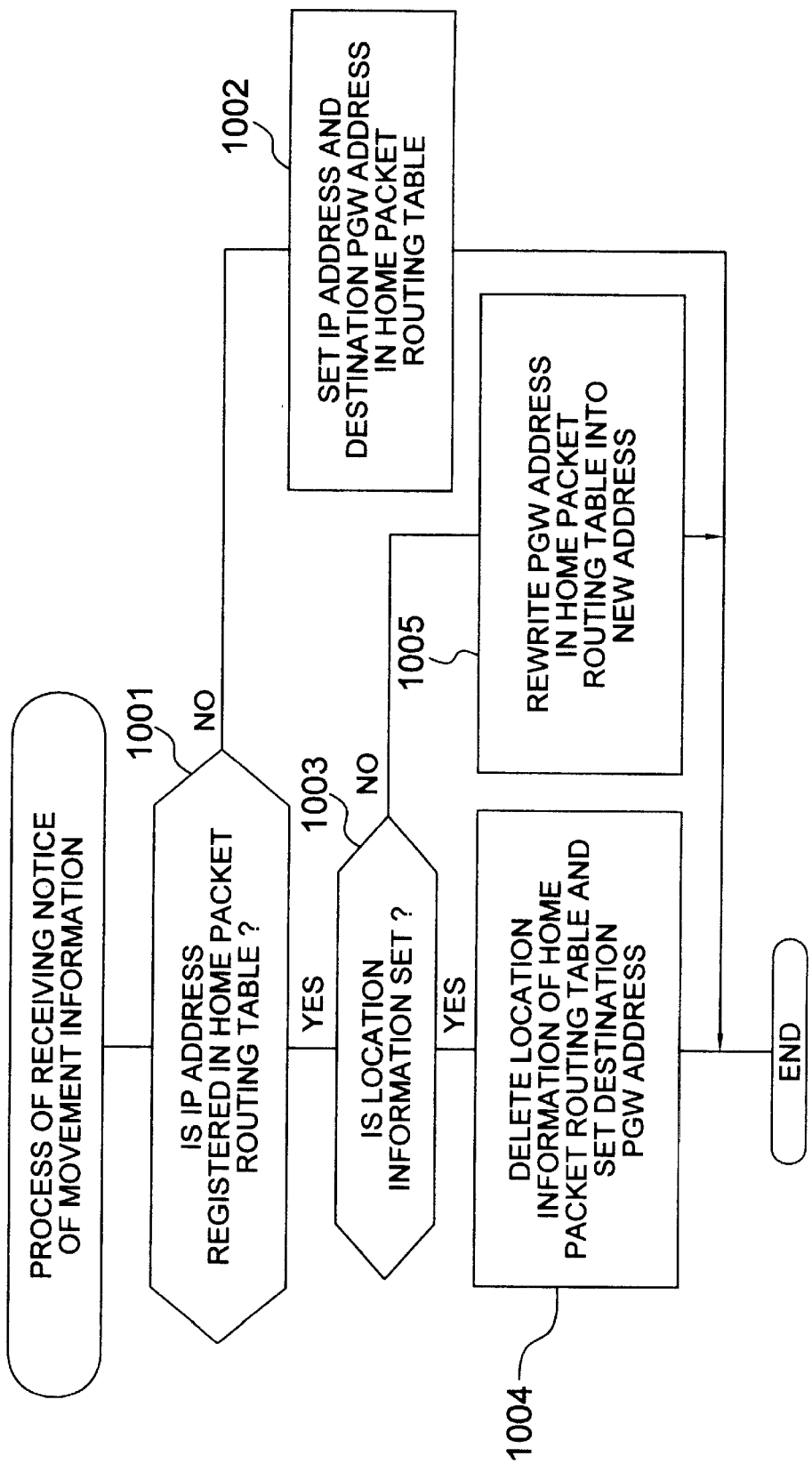
FIG. 10 is a flowchart showing a process for receiving a notice for moving information to be executed by the packet gate way (PGW) included in the first embodiment.

In turn, the description will be oriented to the content of the process for receiving the notice for moving information to be executed by the home PGW 108 with reference to the flowchart of FIG. 10.

The home PGW 108 performs the process for receiving the notice for moving information shown in FIG. 10 when it receives the notice for moving information from another PGW 108. As shown in FIG. 10, in the process for receiving the notice for moving information, the home PGW 108 checks whether or not the IP address 302 of the data terminal 112 contained in the received notice for moving information is pre-registered in the home packet routing table 301 (step 1001).

If not registered, the IP address 302 and the IP address 304 of the destination PGW contained in the received notice for moving information are registered in the home packet routing table 301 (step 1002).

If the IP address 302 is pre-registered in the home packet routing table 301 (step 1001), it is checked if the corresponding location information 303 to the IP address 302 has been already set (step 1003). If already set, it indicates that the MS 102 connected with the data terminal having the IP address 302 is moved to another IP subnetwork 110. Hence, the operation is executed to delete the corresponding location information 303 to the IP address 302 of the home packet routing table 301 and the destination PGW address 304 contained in the received notice for moving information to the home packet routing table 301 (step 1004).

If the location information 303 has not been set yet (step 1003), it indicates that the destination PGW address 304 has been already set and the MS 102 connected with the data terminal having the IP address 302 is temporarily moved to another IP subnetwork 110 and then is returned to another IP subnetwork 110. Hence, the operation is executed to rewrite the destination PGW address 304 of the home packet routing table 301 into the destination PGW address 304 contained in the received notice for moving information (step 1005).

Figure 11:
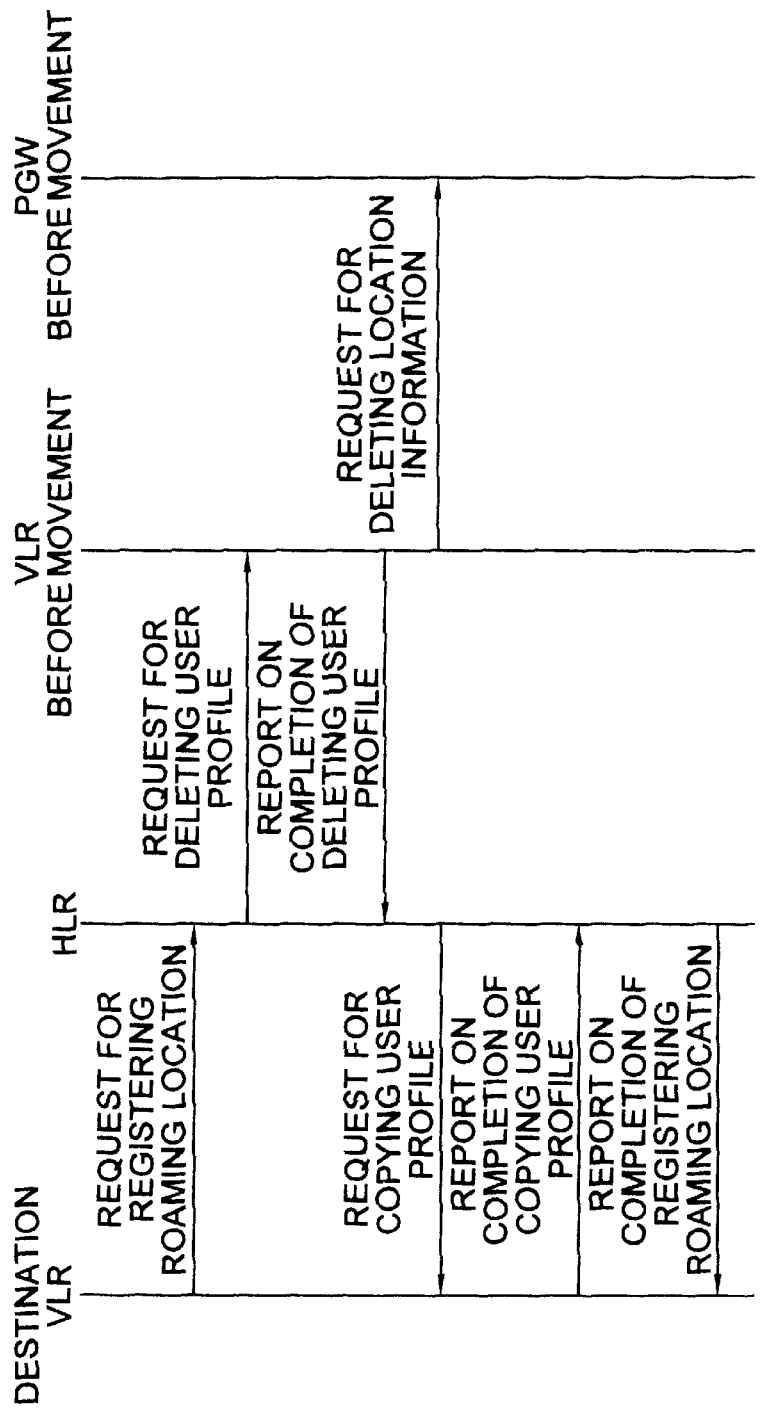
FIG. 11 is a view showing a sequence for a process for registering a roaming location of the visitor location register (VLR) included in the first embodiment.

FIG. 11 is a view showing a sequence of a process of registering a roaming location of the VLR 107.

According to the process as described above, the location information 303 having been set to the visitor packet routing table 401 in the PGW 108 before movement may be deleted by the process of registering the roaming location as shown in FIG. 11.

That is, as shown in FIG. 11, when the home location register (referred to as an HLR) 107 that corresponds to the VLR where the MS 102 belongs receives the request for registering the roaming location, the request being transmitted from the destination VLR 107 at the step 803 of FIG. 8, the HLR 107 operates to send the request for deleting a user profile to the VLR 107 at the previous location, that is, before movement.

When the VLR 107 at the previous location receives the request for deleting the user profile from the HLF 107, the VLR 107 obtains the IP address 302 of the data terminal 112 connected with the relevant MS 102 from the MS location information table 601 and sends the request for deleting the location information containing the obtained IP address 302 to the PGW 108 before movement.

When the PGW 108 before movement receives the request for deleting the location information from the VLR 107 before movement, the PGW 108 operates to delete the relevant IP address 302 and the relevant location information 303 from the visitor packet routing table 401.

Figure 12:
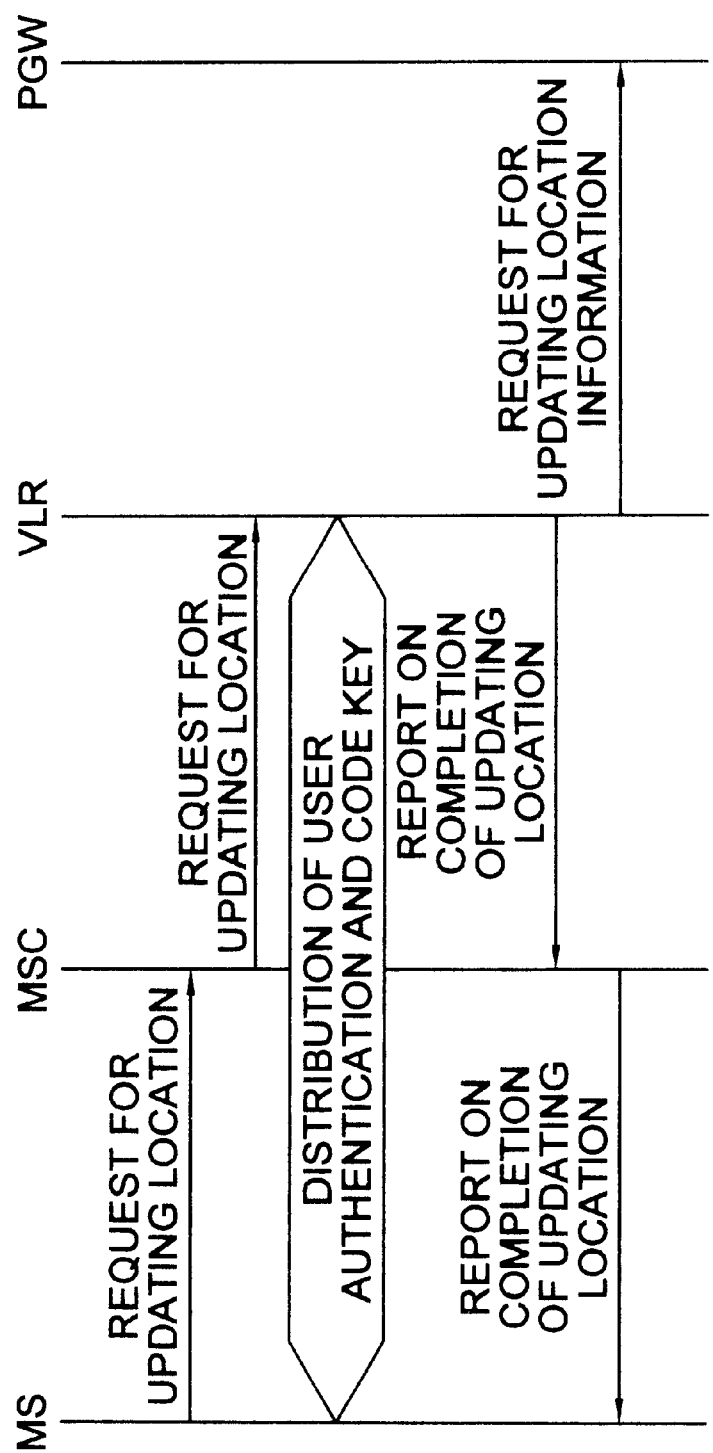
FIG. 12 is a view showing a sequence for a process for updating location information of a mobile station (MS) included in the first embodiment.

FIG. 12 shows the sequence of the process for updating the location information within the same IP packet subnetwork.

As shown in FIG. 1, the MS 102 receives the location information broadcast from the BS 104. If the mismatch of the location information held by the MS 102 to the broadcast location information is detected, the request for updating the location contained in the MS user ID 602 is sent to the MSC 106 through the BC 104.

When the MSC 106 receives the request for updating the location from the MS 102, the MSC 106 operates to send the request for updating the location with the location information 303 of the MS 102 added thereto to the corresponding VLR 107 to the MSC itself.

Herein, the content of the process of receiving the request for updating the location to be executed by the VLR 107 will be described with reference to FIG. 13.

Figure 13:
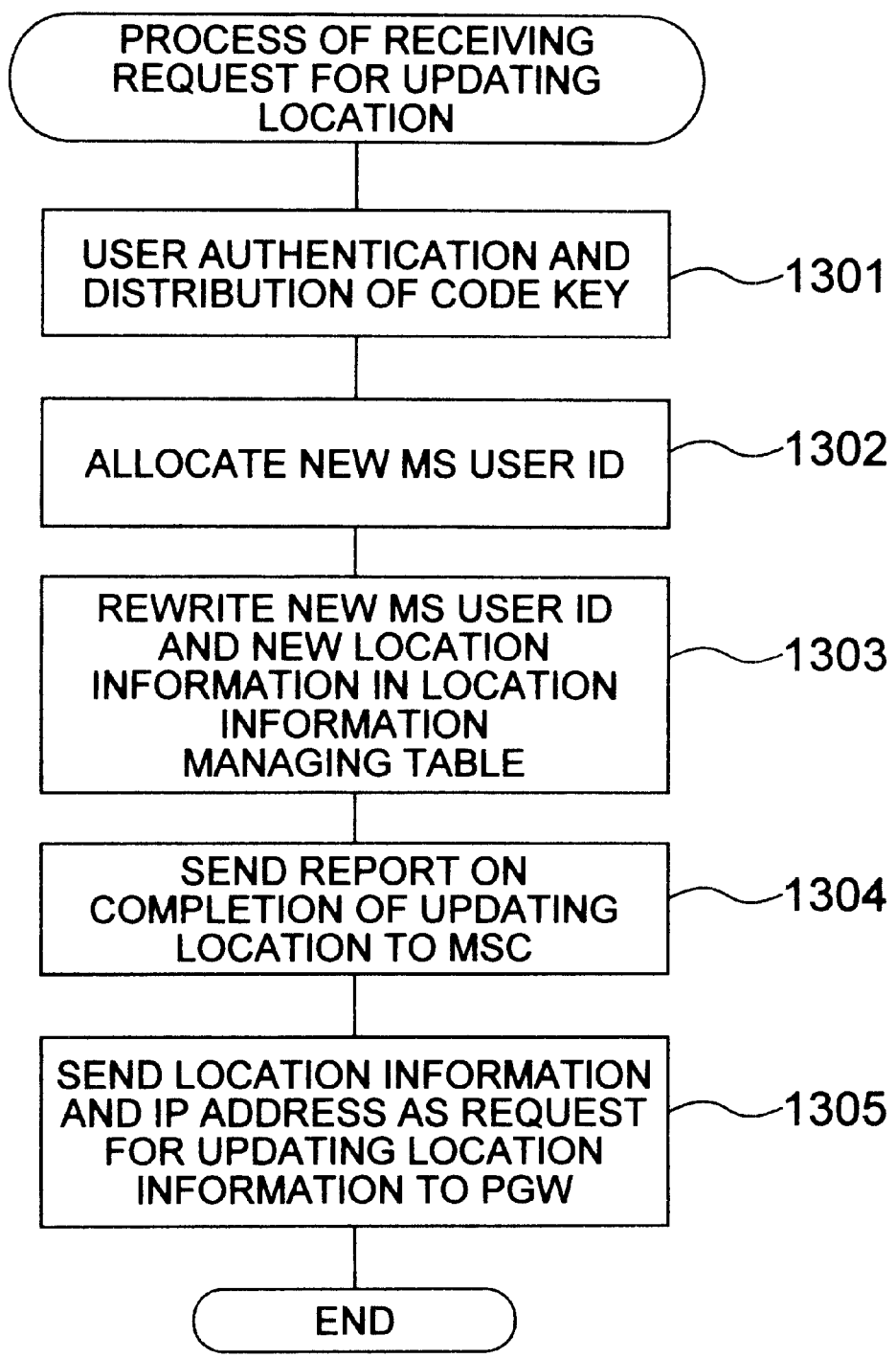
FIG. 13 is a flowchart showing a process for receiving a request for updating a location to be executed by the visitor location register (VLR) included in the first embodiment.

When the VLR 107 receives the request for updating the location from the MSC 106, the VLR 107 performs the process of receiving the request for updating the location shown in FIG. 13.

As shown in FIG. 13, like the process of receiving the request for registering the location shown in FIG. 8, in the process of receiving the request for updating the location, at first, the VLR 107 operates to distribute the user authentication and the code key to the MS 102 (step 1301).

In succession, the VLR 107 operates to assign a new MS user ID 602 to the MS 102 (step 1302). Then, the location information 303 contained in the received request for updating the location and the new MS user ID 602 assigned to the MS 102 at the step 1302 are written in the MS location information table 601 (step 1303).

Then, as shown in FIG. 12, the VLR 107 sends the report about completion of updating the location contained in the new MS user ID 602 to the MSC 106 (step 1304). This report sent from the MSC 106 to the MS 102 enables the new MS user ID 602 to be notified to the MS 102.

Then, in order to notify the location update information of the PGW 108, the VLR 107 operates to send the IP address 302 corresponding to the new MS user ID 602 whose MS location information table 601 is updated at the step 1303 and the location information 303 whose MS location information table 601 is updated at the step 1303 to the corresponding PGW 108 as the request for updating the location information (step 1305).

On the other hand, when the PGW 108 receives the request for updating the location information from the VLR 107, if the IP address 302 contained in the received request for updating the location information belongs to another IP subnetwork 110, the location information 303 of the visitor packet routing table 401 is rewritten into the location information 303 contained in the received request for updating the location information. On the other hand, if it belongs to the local IP subnetwork 110, the location information 303 of the home packet routing table 301 is rewritten into the location information 303 contained in the received request for updating the location information.

Then, the description will be oriented to the IP packet routing procedure using the home packet routing table 301 as the visitor packet routing table 401 created by the PGW 108 with reference to FIGS. 14 to 19.

FIGS. 14A to 14D show the sequence of four possible patterns of packet routing to be considered by the PGW 108 if the PGW 108 receives the IP packet from the sending side MS 102 after the sending side data terminal (for example, 112*a*) having sent the IP packets has completed the access by using the destination data terminal (for example, 112*c*) and the IP address.

As shown in FIG. 14A, the first pattern indicates the case that on the completion of access the IP address of the destination data terminal 112 belongs to the same IP subnetwork 110 as the sending data terminal 112 and even at the time of transferring the IP packets the MS 102 connected with the sending data terminal 112 is located within the relevant IP subnetwork 110. The location where the MS 102 connected with the sending side data terminal 112 is located within the IP subnetwork 110 means that the MS 102 is located within the service area (the same radio cell 103) composing the relevant IP subnetwork 110.

In this case, the MS 102 connected with the sending side data terminal 112 operates to send the IP packets to the PGW 108 through the BS 104 and the RNC 105. These IP packets are transferred to the MS 102 connected with the destination data terminal 112 by the PGW 108 through the BS 104 and the RNC 105.

Figure 14B:
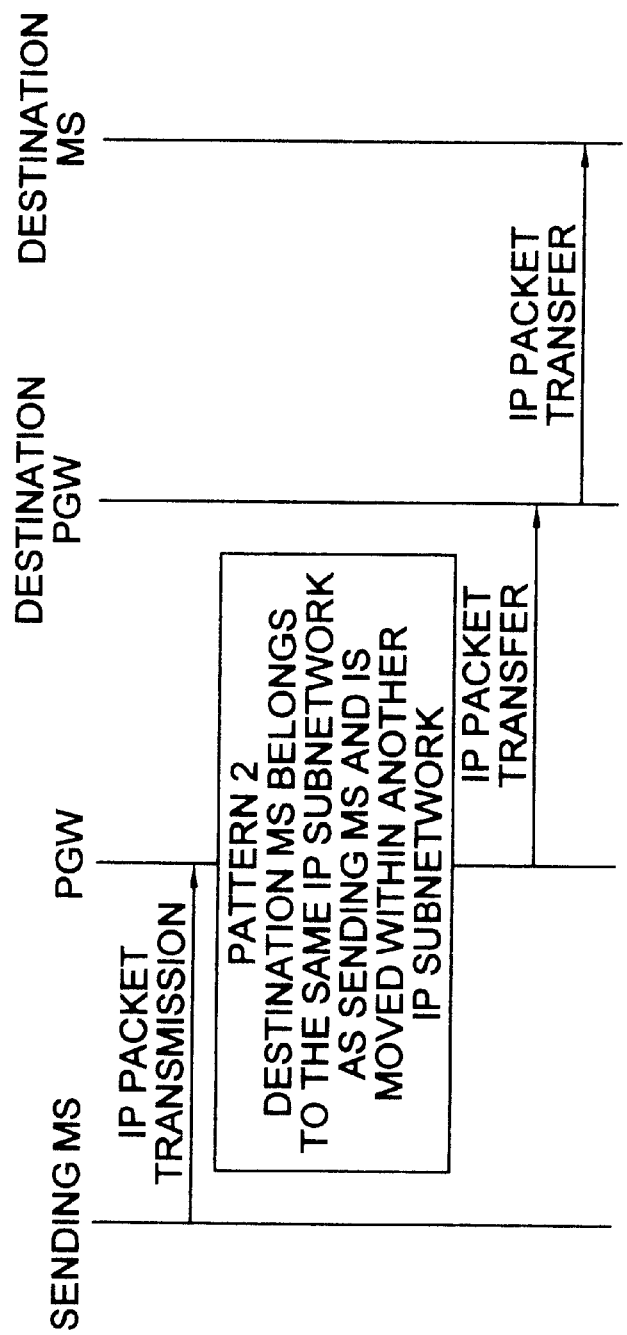

Further, as shown in FIG. 14B, the second pattern indicates the case that on the completion of access, the IP address of the destination data terminal 112 belongs to the same IP subnetwork 110 as the sending data terminal 112 but at the time of transferring the IP packets, the MS 102 connected with the destination data terminal 112 is being moved into another IP subnetwork 110.

In this case, at first, the IP packets are sent from the MS 102 connected with the sending side data terminal 112 to the PGW 108 through the BS 104 and the RNC 105. These IP packets are transferred from the PGW 108 to another PGW 108 for managing the destination IP subnetwork 110 to which the MS 102 connected with the destination data terminal 112 is moved. Then, the IP packets are transferred to the MS 102 connected with the destination data terminal 112 through the BS 104 and the RNC 105 by means of the destination PGW 108.

As shown in FIG. 14C, the third pattern indicates the case that both upon completion of access and at the time of transferring the IP packets, the IP address of the destination data terminal 112 belongs to any one of the IP subnetworks 110 included in the mobile communication system 101 but does not belong to the same IP subnetwork 110 as the sending side data terminal.

In this case, at first, the IP packets are sent from the MS 102 connected with the sending side data terminal 112 to the PGW 108 through the BS 104 and the RNC 105. These IP packets are transferred from the PGW 108 to another PGW 108 for managing the IP subnetwork 110 where the destination data terminal 112 belongs. The destination PGW 108 enables the IP packets to be transferred to the MS 102 connected with the destination data terminal 112 through the BS 104 and the RNC 105.

As shown in FIG. 14D, the fourth pattern indicates the case that the IP address of the destination data terminal 112 does not belong to any one of the IP subnetworks 110 included in the mobile communication system 101.

In this case, the IP packets are transferred from the MS 102 connected with the destination data terminal 112 to the PGW 108 through the BS 104 and the RNC 105. Then, these IP packets are transferred from the PGW 108 to the internet 109.

Figure 15A:
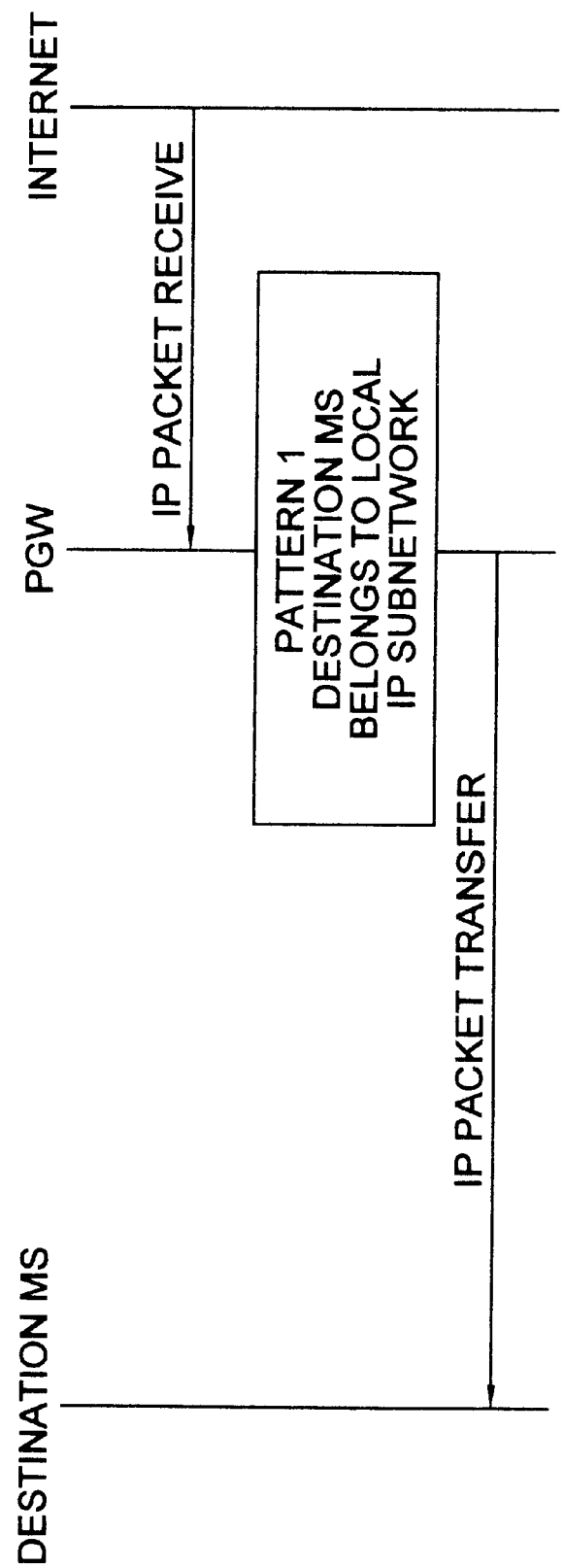
FIGS. 15A and 15B are views showing two possible packet routings in the packet gate way (PGW) if an IP packet is received from the internet.
Figure 15B:
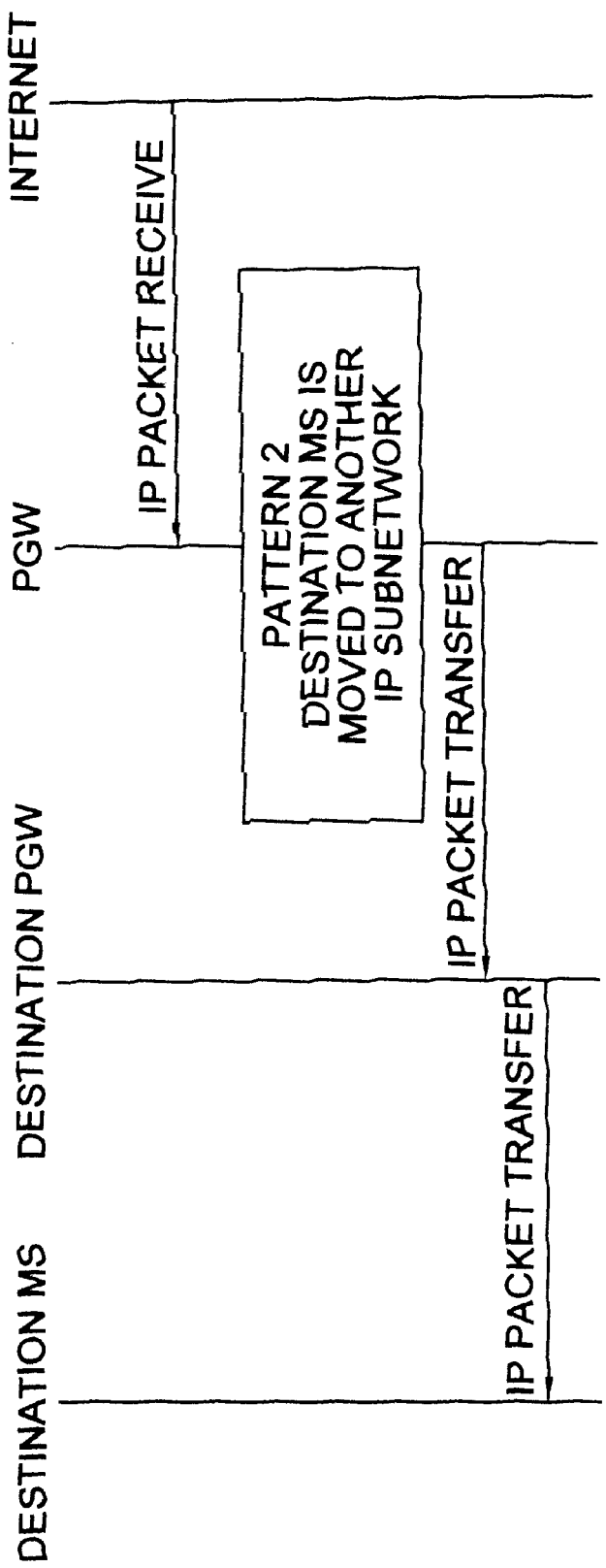

FIGS. 15A and 15B show the sequence of two possible patterns of packet routing that may appear in the PGW 108 if the IP packet is received by the MS 102 from the internet 109 after the data terminal 112 connected with the MS 102 has completed the access with the internet 109.

As shown in FIG. 15A, the first pattern indicates the case that at the time of transferring the IP packets from the internet 109, the MS 102 connected with the destination data terminal 112 is located within the IP subnetwork 110 managed by the home PGW itself.

In this case, the IP packets sent from the internet 109 are transferred by the PGW 108 having received those packets to the MS 102 connected with the destination data terminal through the BS 104 and the RNC 105.

Further, as shown in FIG. 15B, the second pattern indicates the case that at the time of transferring the IP packet from the internet 109, the MS 102 connected with the destination data terminal 112 is being moved into another IP subnetwork 110.

In this case, at first, the IP packets sent from the internet 109 are transferred from the PGW 108 having received those packets into another PGW 108 for managing the IP subnetwork 110 to which the MS 102 connected with the destination data terminal is being moved. The destination PGW 108 enables the IP packets to be transferred to the MS 102 connected with the destination data terminal through the BS 104 and the RNC 105.

Figure 16:
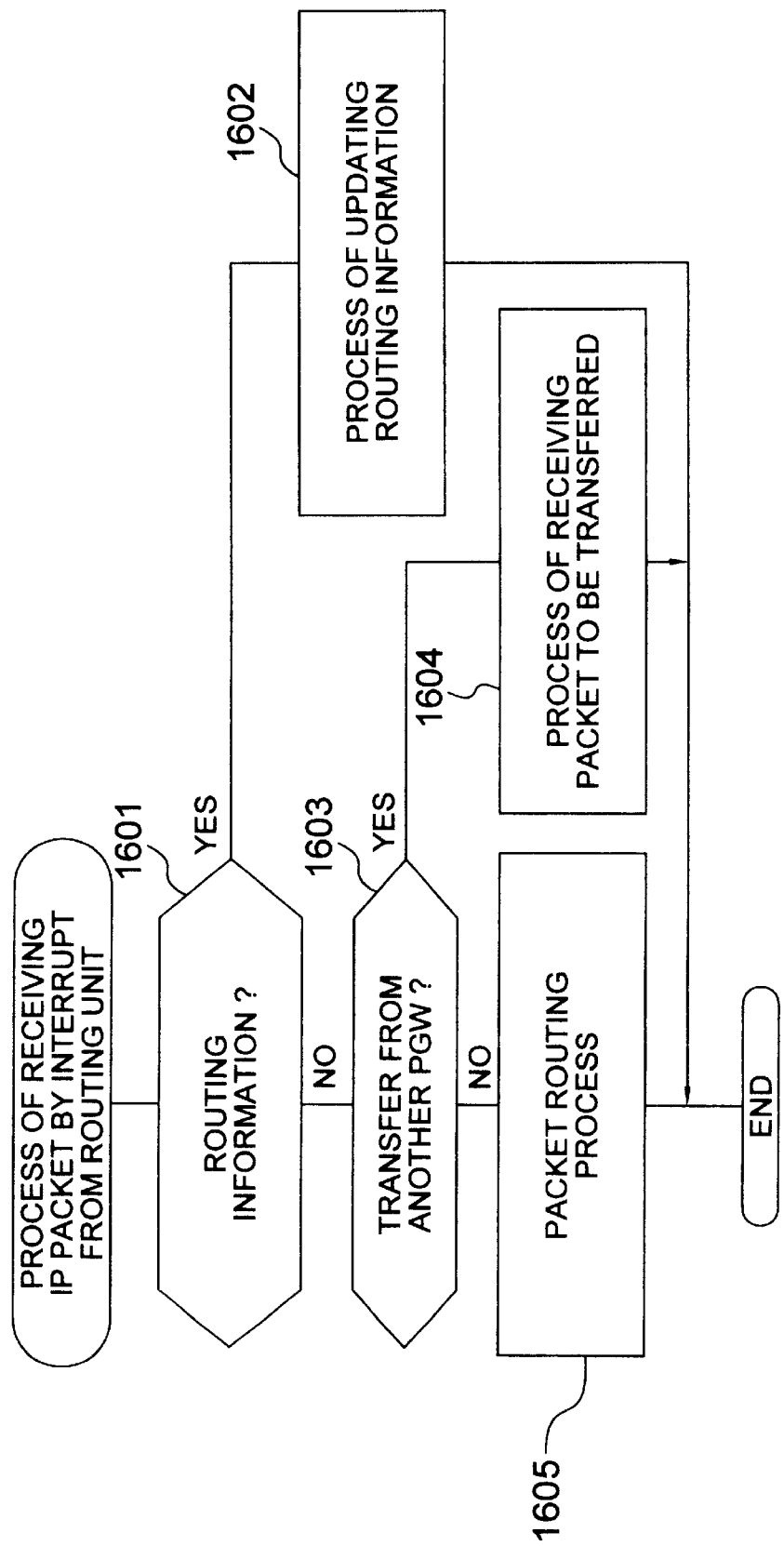
FIG. 16 is a flowchart showing a process for receiving an IP packet to be executed by the packet gate way (PGW) included in the first embodiment.

FIG. 16 is a flowchart showing a process of receiving the IP packets to be executed by the PGW 108. The process shown in FIG. 16 is executed by the managing unit 210 included in the PGW 108 and is started by the interrupt given by the routing unit 220 when it receives the IP packet.

As shown in FIG. 16, in the process of receiving the IP packets, if the IP packets received from the routing unit 220 contain the routing information received from the internet 109, the managing unit 210 of the PGW 108 operates to update the routing information required for realizing the router function (step 1602). In addition, the process of the step 1602 is likewise to the router function provided in the normal router.

If the IP packets received from the routing unit 220 are those transferred from another PGW 108 (step 1603), the managing unit 210 of the PGW 108 indicates that those IP packets are those to be transferred to the data terminal having an IP address that does not belong to the local IP subnetwork 110 and to the data terminal being moved into the local IP subnetwork 110. Hence, the process of receiving the packets (to be discussed below) will be executed (step 1603).

If the IP packets received from the routing unit 220 are not those transferred from another PGW 108 (step 1603), the managing unit 210 of the PGW 108 indicates that those IP packets are to be sent to the data terminal having an IP address belonging to the local IP subnetwork 110. Hence, the packet routing process (to be discussed below) will be executed (step 1605).

Figure 17:
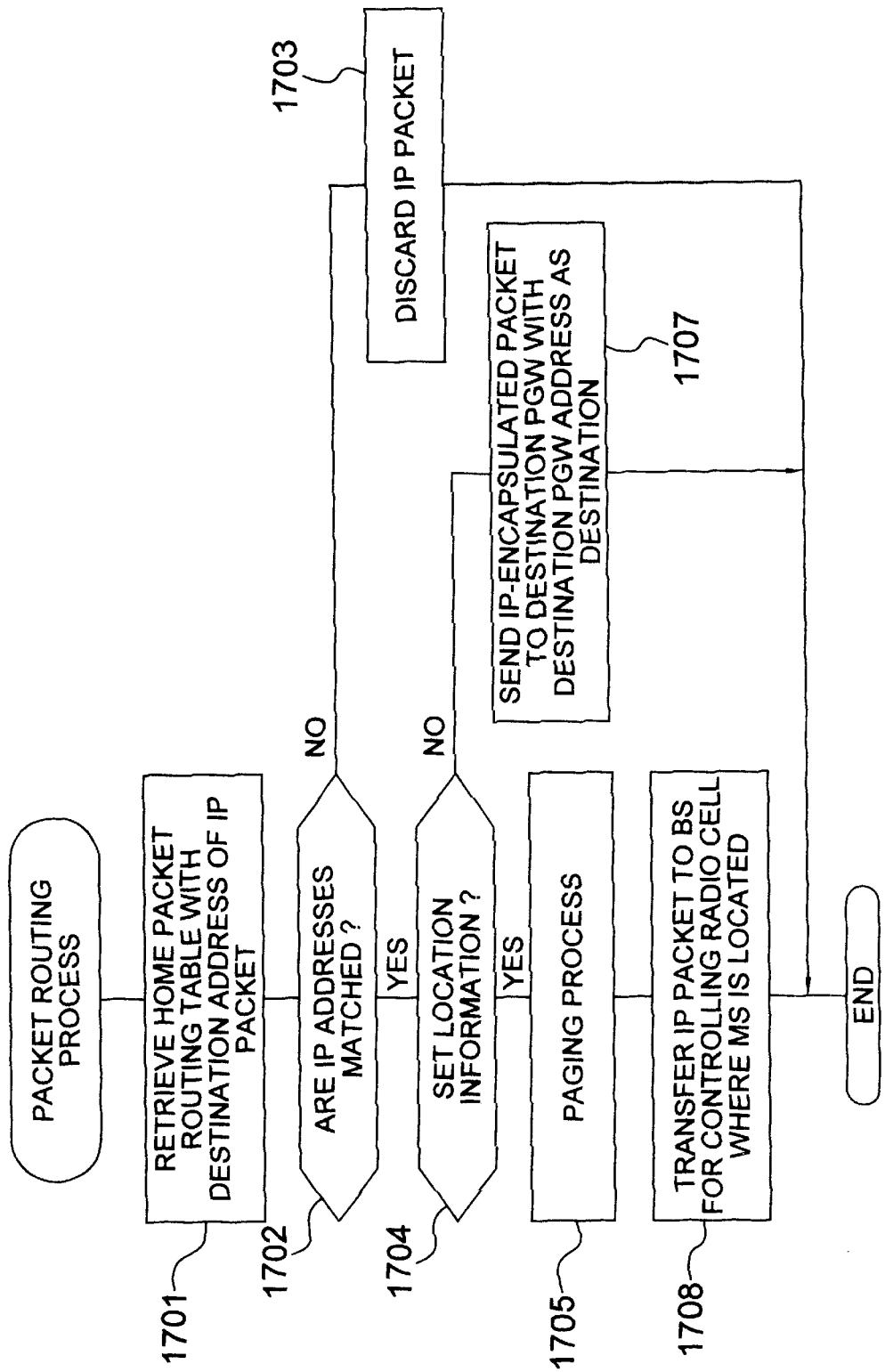
FIG. 17 a flowchart showing a packet routing process to be executed at a step 1605 of FIG. 16.

Herein, the description will be oriented to the content of the packet routing process to be executed at the step 1605 of FIG. 16 with reference to the flowchart of FIG. 17.

As shown in FIG. 17, in the packet routing process, the managing unit 210 of the PGW 108 is served to retrieve the home packet routing table 301 with the destination address of the IP packets received from the routing unit 220 (step 1701).

If no matched IP address 302 exists in the home packet routing table 301 (step 1702), the IP packets are discarded (step 1703). If a matched IP address 302 exists in the home packet routing table 301 (step 1702), it is checked if the corresponding location information 303 is set (step 1704).

If the location information 303 is set (step 1704), it indicates that the destination data terminal is located within the local IP subnetwork 110. Hence, the managing unit 210 of the PGW 108 performs a paging process based on the set location information 303 (step 1705). The paging process is executed to grasp the BS 104 for managing the radio cell 103 where the MS 102 connected with the destination data terminal 112 is located. Then, on the PVC connected with this BS 104, the IP packets are sent through the RNC interface 204 (step 1706).

If no location information 303 is set (step 1704), it indicates that the destination PGW address 304 is set and the destination data terminal is being moved to another IP subnetwork 100. Hence, the managing unit 210 of the PGW 108 is served to IP-encapsulate the IP packets with the destination PGW address 304 as the destination address and then transfer the encapsulated packets to the destination PGW 108 through the routing unit 220 (step 1707).

Figure 18:
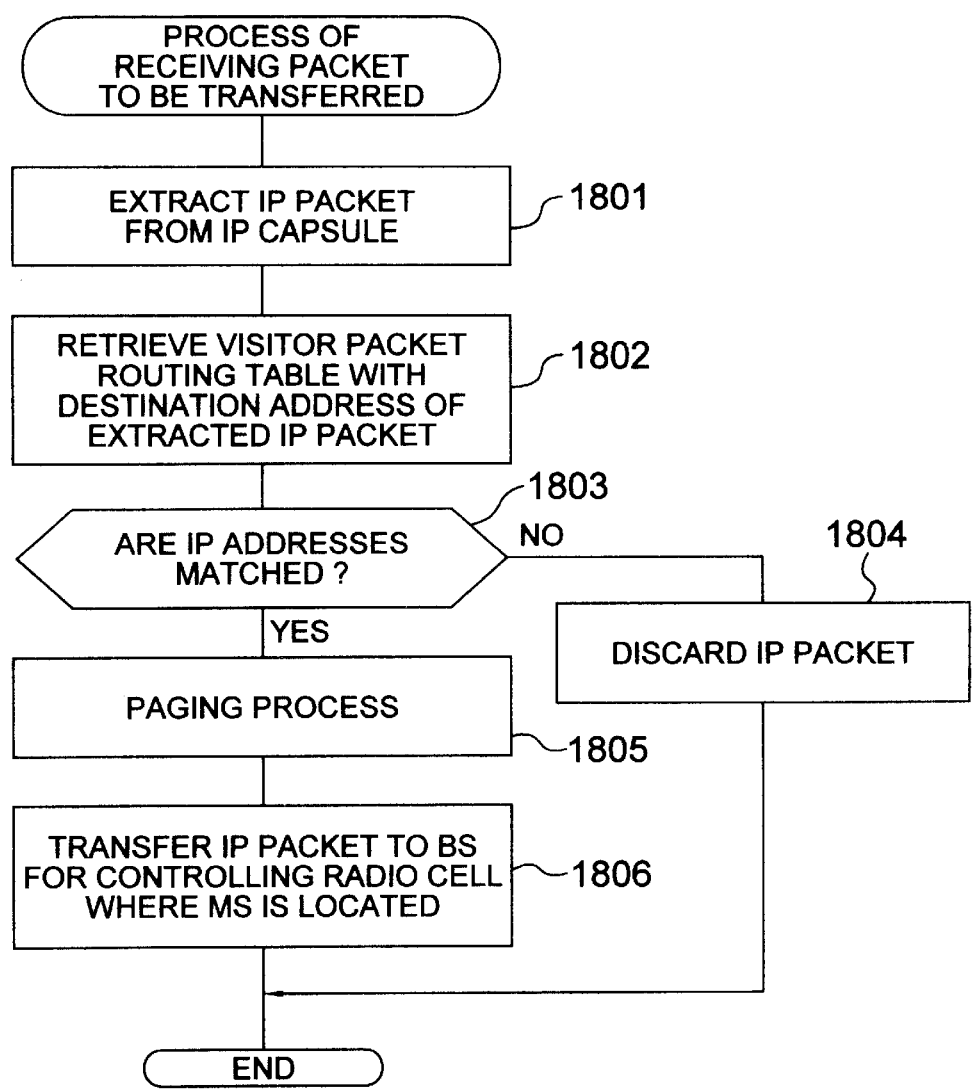
FIG. 18 is a flowchart showing a process for receiving a transfer packet to be executed at a step 1604 of FIG. 16.

Next, the description will be oriented to the content of the process of receiving the packets to be transferred at the step 1604 of FIG. 16 with reference to the flowchart of FIG. 18.

As shown in FIG. 18, in the process of receiving the to-be-transferred packets sent from another PGW 108, at first, the managing unit 210 of the PGW 108 is served to extract the IP packets from the IP packet capsule received from the routing unit 220 (step 1801) and then retrieve the visitor packet routing table 401 with the destination address contained in the extracted IP packets (step 1802).

If no matched IP address 302 exists in the visitor packet routing table 401 (step 1803), it indicates that the destination data terminal is not located within the local IP subnetwork 110. Hence, the managing unit 210 of the PGW 108 is served to discard the IP packets (step 1804).

If a matched IP address 302 exists in the visitor packet routing table 401 (step 1803), it indicates that the destination data terminal is located within the local IP subnetwork 110. The managing unit 210 of the PGW 108 is served to execute the paging process based on the corresponding location information 303 (step 1805). The paging process is executed to grasp the BS 104 that manages the radio cell 103 where the MS 102 connected with the destination data terminal is located. Then, on the PVC connected with the BS 104, the managing unit 210 is further served to send the IP packets through the RNC interface 204. (step 1808).

Figure 19:
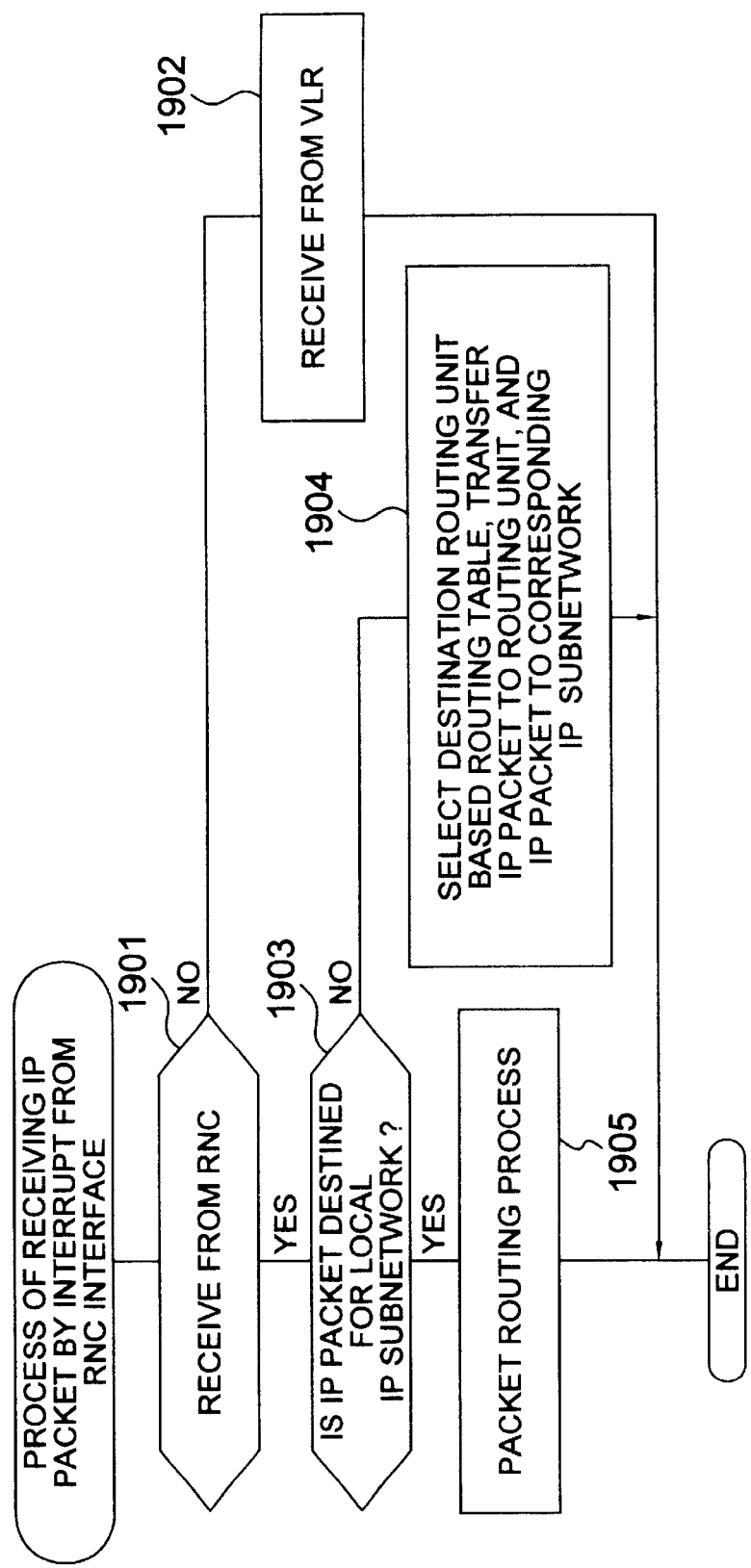
FIG. 19 is a flowchart showing a process for receiving an IP packet to be executed by the packet gate way (PGW) included in the first embodiment.

FIG. 19 is a flowchart showing a process of receiving the IP packets to be executed by the PGW 108.

The process shown in FIG. 19 is to be executed by the managing unit 210 of the PGW 108. The process is started by the interrupt given from the RNC interface 230. The interface 230 operates to receive ATM cells sent from the data terminal 112 connected with the MS 102 located within the local IP subnetwork 110 and then convert them into the IP packets.

As shown in FIG. 19, in the process of receiving the IP packets, the managing unit 210 of the PGW 108 is served to determine if the IP packets received from the RNC interface 230 correspond to those received from the RNC 105 or those received from the VLR 107 on the transfer path of the IP packets, that is, the PVC (step 1901). If those IP packets are received from the VLR 107, the managing unit 210 is served to execute any one of the process of receiving the request for registering the location information as shown in FIG. 9, the process of receiving the notice for moving information as shown in FIG. 10, and the foregoing process of receiving the request for deleting the location information (step 1902).

If the IP packets are received from the RNC 105 (step 1901), the managing unit 210 of the PGW 108 is served to check if the IP address of the IP subnetwork 110 to be extracted from the destination address indicated in the IP packets corresponds to the IP address of the local IP subnetwork 100. This is for checking those packets are intended for the local IP subnetwork 100 (step 1903).

If those IP packets are not for the local IP subnetwork 110 (step 1903), the managing unit 210 of the PGW 108 is served to select the destination routing unit 220 based on the routing table. A forward process is executed for the IP packets in the normal router. This forward process is intended for transferring the IP packets to the relevant IP subnetwork 110 by transferring the IP packets to a buffer memory 224 of the selected routing unit 220 (step 1904).

If those IP packets are for the local IP subnetwork 110 (step 1903), the managing unit 210 of the PGW 108 is served to perform the packet routing process shown in FIG. 17 (step 1905).

As described above, in the first embodiment, two or more PGWs 108 are connected between the mobile communication system 101 and the internet 109. Hence, plural IP subnetworks 110 corresponding to the PGWs 108 may be built in the mobile communication system 101.

In the first embodiment, the request for registering the location provided from the MS 102 contains the IP address 302. At a time, the VLR 107 notifies the PGW 108 of the IP address 302 of the MS 102 and the location information 303 in the processes of registering the location and updating the location. Moreover, if the IP address 302 notified by the VLR 107 does not belong to the local IP subnetwork 110, the PGW 108 notifies the IP address 302 and the local IP address (destination PGW address 304) of the PGW 108 that manages the IP subnetwork 100 where the IP address 302 belongs. According to the first embodiment, therefore, even if the data terminal 112 is moved between the IP subnetworks 110, the packet routing can be realized which may transmit the IP packets to the MS 102 connected to the data terminal 112. That is, the mobile communication system 101 being in communication with the internet 109 may select an optimal path for an IP packet transfer from the MS 102 to the internet 109 or vice versa within the system itself.

As described above, the arrangement according to the first embodiment allows the movement of the data terminal between the IP subnetworks 110 and accordingly the movement of the data terminal 112 between the IP subnetworks 110 each of which belongs to another mobile communication system 101.

Further, in the first embodiment, the IP packet transfer to the MS 102 is realized on the basis of the existing management of the movement of the mobile communication system 101. This thus eliminates a great overhead to be burdened to the management of the movement if the Mobile IP is applied to the mobile communication system 101.

Also in the first embodiment, the IP address of the data terminal may be fixed. This also thus eliminates the communication for obtaining the IP address of the data terminal if the IP packet transfer is done by the network initiative.

As will be obvious from the above description, in the first embodiment, the group of the MS's 102 whose location information and subscriber's information are managed by the VLR 107 does not necessarily coincide with the group of the data terminals whose IP addresses are managed by the PGW 108. In the arrangement shown in FIG. 1, hence, the location information and the subscriber's information of each of the MS's 102 held in the MCS 106 are managed by the corresponding VLR 107 to the MCS 106. At a time, all the RNCs 105 connected to the MCS 106 are connected to one PGW 108. Hence, the overall service area whose call is controlled by one MCS 106 is arranged to coincide with the IP subnetwork 110 corresponding to one PGW 108. However, a certain installation of the RNC 105 allows the RNC 105 connected to another MCS 106 to be connected to one PGW 108.

Figure 20:
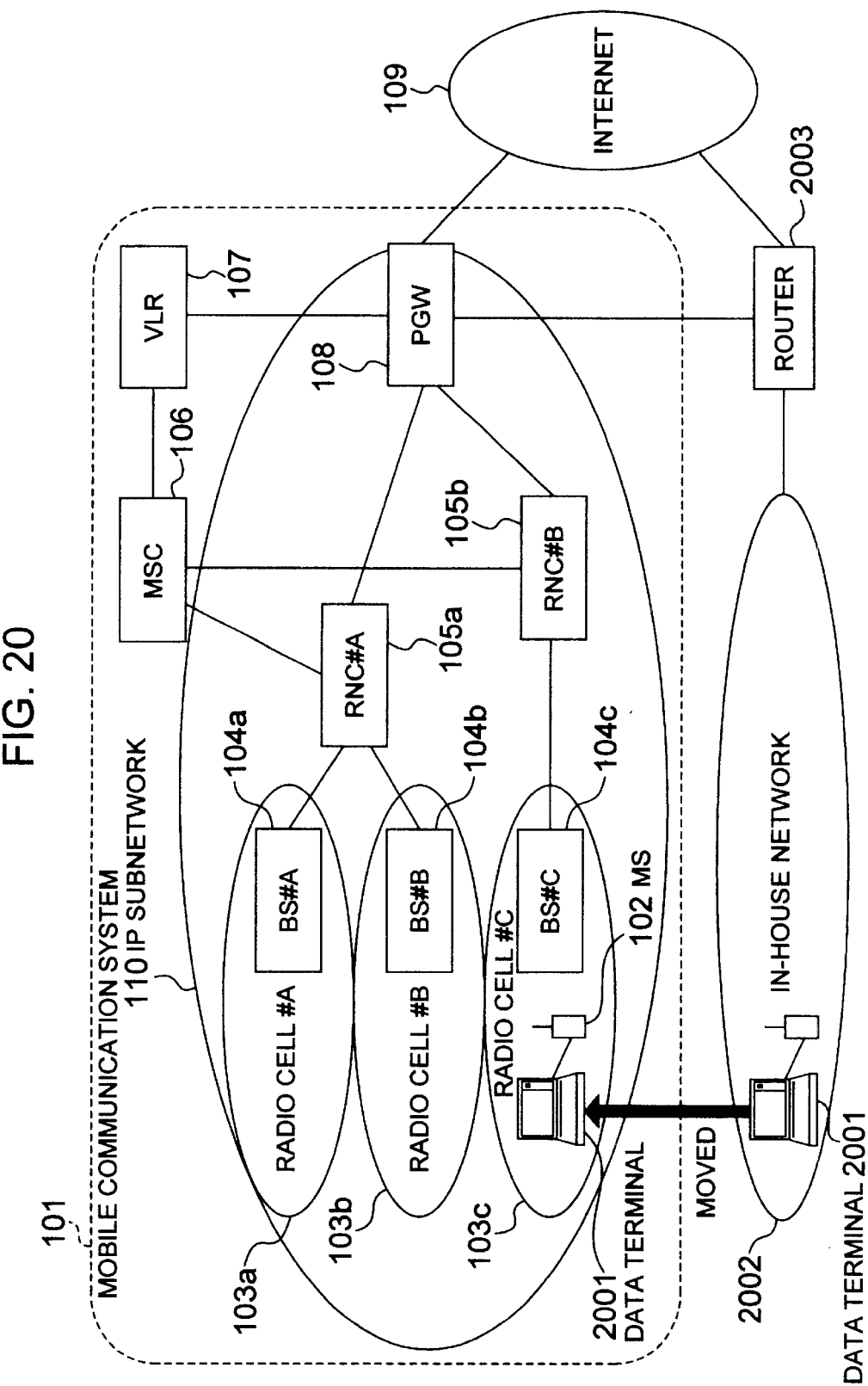
FIG. 20 is a diagram showing an arrangement of a mobile communication system according to a second embodiment of the present invention.
Figure 21:
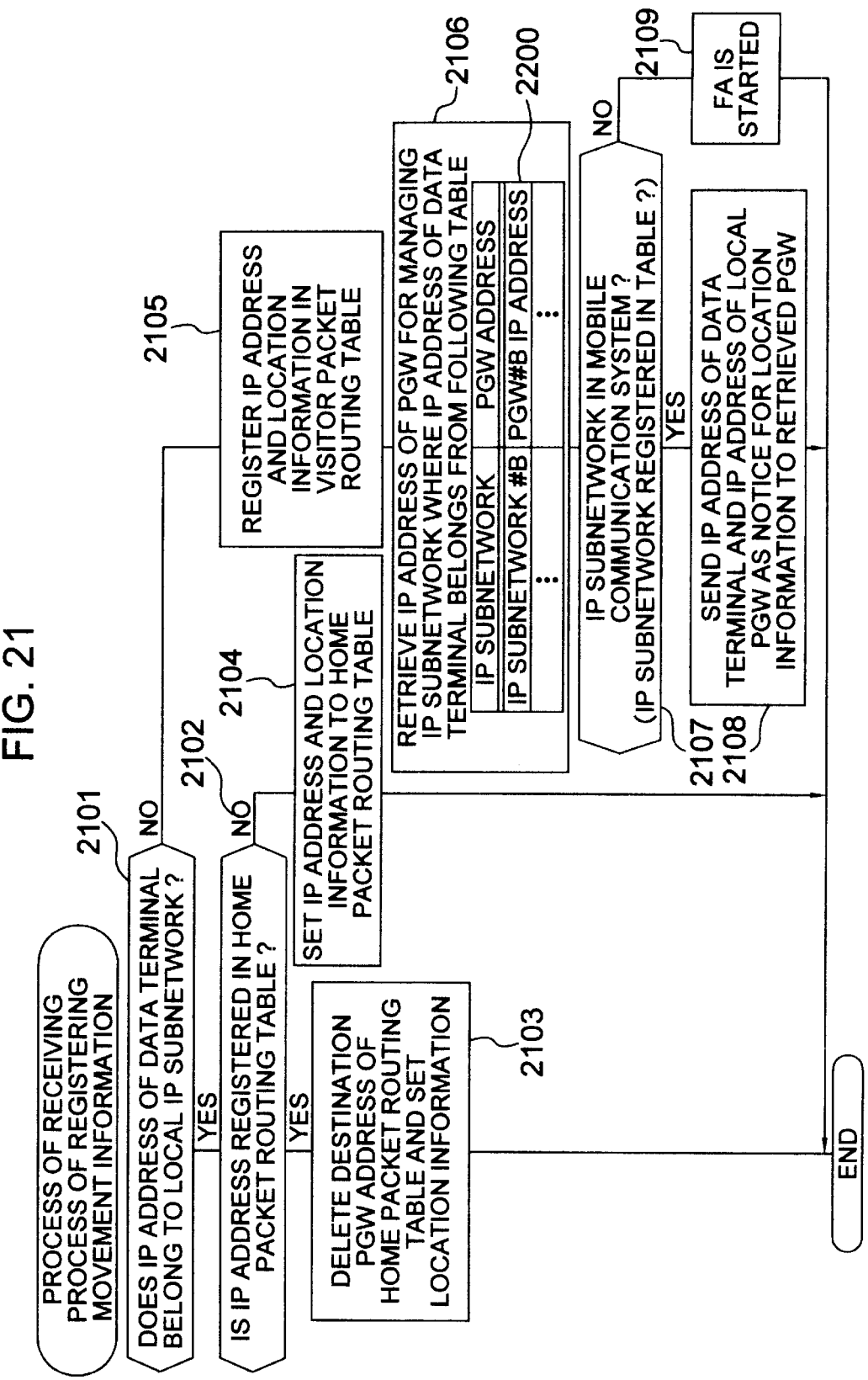
FIG. 21 is a flowchart showing a process for receiving a request for registering location information to be executed by the packet gate way (PGW) included in the second embodiment.

In turn, the description will be oriented to the second embodiment of the invention with reference to FIGS. 20 to 21.

In the foregoing first embodiment, the IP address of the data terminal 112 connected to the MS 102 belongs to any IP subnetwork 110. That is, the IP address is required to be managed by any PGW 108. However, the data terminal whose IP address belongs to another IP network may be moved to the mobile communication system 101, in which the data terminal is connected to the MS 102 when it is in use.

According to the second embodiment, if such a data terminal is connected to the MS 102 within the mobile communication system 101 when it is in use, the data terminal may make access to the IP network where the IP address of the data terminal belongs and the internet 109 without having to update the IP address of the data terminal.

FIG. 20 shows an arrangement of the mobile communication system according to the second embodiment of the invention.

As shown in FIG. 20, like the mobile communication system according to the first embodiment shown in FIG. 1, the mobile communication system 101 according to the second embodiment accommodates plural MS's 102.

As shown in FIG. 20, the mobile communication system 101 according to the second embodiment is connected to the internet 109 through one PGW 108 so that one IP subnetwork 110 is arranged in the mobile communication system 101.

Herein, the PGW 108 has a foreign agent function in the Mobile IP.

Also herein, an in-house network 2002 is connected to the internet 109 through a router 2003 having a home agent function in the mobile IP.

In the second embodiment, the data terminal 2001 whose IP address belongs to the in-house network 2002 is moved to the mobile communication system where it is used without changing the IP address.

Also in the second embodiment, in the process for registering the location of the MS 102 connected with the data terminal 2001 to be done when the data terminal 2001 is moved to the mobile communication system 101, the PGW 108 performs a different process of receiving the request for registering the location information rather than the process done in the first embodiment. That is, the arrangement of the second embodiment has a different process of receiving the request for registering the location information to be done by the PGW 108 from the arrangement of the first embodiment.

FIG. 21 is a flowchart showing a process of receiving a request for registering the location information to be done by the PGW 108.

As shown in FIG. 21, in the process of receiving the request for registering the location information, the PGW 108 determines if the IP address 302 contained in the received request for registering the location information belongs to the local IP subnetwork 110, that is, the IP subnetwork managed by the PGW 108 itself (step 2101).

If it belongs to the local IP subnetwork 110, the similar process to that at the steps 902 to 904 of FIG. 9 is executed (steps 2102 to 2104). Further, if the IP address 302 contained in the received request for registering the location information belongs to another IP subnetwork 110 (step 2101), the IP address 302 and the location information 303 contained in the received request for registering the location information may be registered in the visitor packet routing table 401 (step 2105).

Further, the PGW 108 operates to retrieve the PGW 108 for managing the IP subnetwork 110 where the IP address 302 belongs from a table 2200 in which the IP addresses of the IP subnetwork 110 to be extracted from the IP address 302 are located in correspondence to the IP addresses of the PGW 108 for managing the IP subnetwork 110 (step 2106).

If the PGW 108 may be retrieved (step 2107), the data terminal connected to the MS 102 contains the IP address 302 that belongs to the IP subnetwork 110 of the mobile communication system 101. Hence, the PGW 108 performs the similar process to that at the step 907 in FIG. 9 (step 2108).

On the other hand, if the PGW 108 cannot be retrieved at the step 2106, the PGW 108 determines that the data terminal connected to the MS 102 is moved from the IP network outside of the mobile communication system 101 through the internet 108. Then, the PGW 108 serves to do the foreign agent function (step 2109).

The foreign agent function of the PGW 108 is served to store the IP address of the data terminal 2001 and transfer the address care of the foreign agent function (IP address allocated to the foreign agent function itself) to the home agent function of the router 2003.

Hence, the PGW 108 may treat the data terminal 2001 as the data terminal having the IP address belonging to the local IP subnetwork 110 through the effect of the foreign agent function. Further, the router 2003 enables to transfer the IP packets to be transferred to the data terminal 2001 to the foreign agent function of the PGW 108 according to the address care of the foreign agent function. It means that the PGW 108 can transfer the IP packets to the data terminal 2001 by doing the process of receiving the IP packets shown in FIG. 16.

As described above, according to the second embodiment, the movement of the data terminal 2001 from another IP network to the IP subnetwork 110 of the mobile communication system 101 may be realized without changing the IP address of the data terminal 2001. In this case, the data terminal 2001 may be operated as if it would support the mobile IP to the router 2003 without loading the program of the mobile IP.

In the foregoing embodiments, the mobile station connected with the data terminal is illustrated. However, it is obvious to those skilled in the art that the invention may apply to the mobile station integrally connected with the data terminal.

What is claimed is:

1. A mobile communication system comprising:
a plurality of devices each configuring a radio cell, and transmitting/receiving signals to/from mobile terminals;
a mobile switching center connected to a respective one of said plurality of devices;
a location register connected to said mobile switching center for managing location information of the respective mobile terminals; and
a plurality of packet gateways directly connected to an IP network which is separate from said mobile communication system,
wherein each of said devices is connected to one of said plurality of packet gateways,
wherein said location register is connected to the one packet gateway which is responsive to a mobile terminal whose location information is being managed by said location register, and
wherein each packet gateway, the device connected thereto, and the mobile terminal which transmits/receives a signal to/from that device form an IP subnetwork.

2. The system of claim 1, wherein each of said devices includes at least one base station for transmitting/receiving a signal to/from a mobile terminal and a network controller connected to the base station, for managing the base station.

3. The system of claim 1, wherein said location register includes means for notifying a packet gateway of the location information of a mobile terminal.

4. The system of claim 3, wherein said location register further includes means for notifying said packet gateway of an IP address possessed by said mobile terminal.

5. The system of claim 4, wherein each mobile terminal includes means for notifying said mobile switching center of identification information of the mobile terminal and an IP address of the mobile terminal,
wherein said mobile switching center includes means for notifying said location register of the identification information notified from the mobile terminal, the IP address and the location information indicating a service area of said device which transmits/receives to/from said mobile terminal, and
wherein said location register includes means for managing said identification information, said location information and said IP address notified from said mobile switching center in a corresponding manner to one another, and means for notifying the packet gateway connected to said location register of said location information and said IP address notified from said mobile switching center.

6. A mobile communication system comprising:
a plurality of devices each configuring a radio cell, and transmitting/receiving signals to/from mobile terminals;
a mobile switching center connected to a respective one of said plurality of devices;
a location register connected to said mobile switching center for managing location information of the respective mobile terminals; and
a plurality of packet gateways connected to an IP network outside said mobile communication system, wherein each of said devices is connected to one of said plurality of packet gateways, wherein said location register is connected to the one packet gateway which is responsive to a mobile terminal whose location information is being managed by said location register, and wherein each packet gateway, the device connected thereto, and the mobile terminal which transmits/receives a signal to/from that device form an IP subnetwork, wherein said location register includes means for notifying a packet gateway of the location information of a mobile terminal, wherein said location register further includes means for notifying said packet gateway of an IP address possessed by said mobile terminal, wherein each mobile terminal includes means for notifying said mobile switching center of identification information of the mobile terminal and an IP address of the mobile terminal, wherein said mobile switching center includes means for notifying said location register of the identification information notified from the mobile terminal, the IP address and the location information indicating a service area of said device which transmits/receives to/from said mobile terminal, and wherein said location register includes means for managing said identification information, said location information and said IP address notified from said mobile switching center in a corresponding manner to one another, and means for notifying the packet gateway connected to said location register of said location information and said IP address notified from said mobile switching center, wherein each of said plurality of packet gateways comprises:
  means for managing the IP address and the location information notified from a location register;
  means, in a case where the IP address notified from said location register does not belong to the IP subnetwork containing the particular packet gateway, for notifying another packet gateway contained in the IP subnetwork to which said IP address belongs of said IP address and an IP address of the particular gateway;
  means for managing the IP address notified from still another packet gateway and the IP address of said still another packet gateway;
  means, in a case where a destination IP address of a received IP packet is managed to correspond to location information, for transferring the received IP packet to a mobile terminal possessing said destination IP address, via the device corresponding to said location information; and
  means, in a case where a destination IP address of a received IP packet is managed to correspond to the IP address of another packet gateway, for transferring said received IP packet to said another packet gateway.

7. A packet gateway connected to a mobile communication network and directly connected to an IP network which is separate from said mobile communication network, said mobile communication network comprising:
  at least one device for configuring a radio cell and transmitting/receiving a signal to/from a mobile terminal;
  a mobile switching center connected to each device; and
  a location register connected to said mobile switching center for managing location information of the mobile terminal,
  wherein said packet gateway comprises:
    a routing unit for connecting with another router on said IP network, and
    a managing unit for controlling transfer of an IP packet to/from said IP network,
    wherein said packet gateway further comprises:
      an interface unit for connecting with each device and said location register, and
      wherein said packet gateway, said at least one device, and the mobile terminal form an IP subnetwork which is connected to said routing unit and said interface unit.

8. A packet gateway connected to an IP network and a mobile communication network, said mobile communication network comprising:
  at least one device for configuring a radio cell and transmitting/receiving a signal to/from a mobile terminal;
  a mobile switching center connected to each device;
  a location register connected to said mobile switching center for managing location information of the mobile terminal,
  wherein said packet gateway comprises:
    a routing unit for connecting with another router on said IP network, and
    a managing unit for controlling transfer of an IP packet to/from said IP network,
    wherein said packet gateway further comprises:
      an interface unit for connecting with each device and said location register,
      wherein said packet gateway, said at least one device, and the mobile terminal form an IP subnetwork which is connected to said routing unit and said interface unit; and
      a memory for storing an IP address possessed by a data terminal connected to a mobile terminal contained in said IP subnetwork and location information indicating a service area of the device responsive to said mobile terminal in a corresponding manner to one another, said IP address being received by said interface unit from said location register,
  wherein, in a case where a destination of an IP packet received by said routing unit or said interface unit is stored in said memory so as to correspond to the location information, said managing unit controls transfer of the received IP packet via said interface unit to the device corresponding to said location information.

9. The packet gateway of claim 8, wherein, in a case where the IP address received by said interface unit does not belong to an IP subnetwork containing said packet gateway, said managing unit connects with said IP network, and controls transmission of said IP address and an IP address of said packet gateway via said routing unit to another packet gateway contained in an IP subnetwork to which said IP address belongs.

10. The packet gateway of claim 8, wherein said packet gateway has a foreign agent function, and
  wherein, in a case where an IP address received by said interface unit from said location register does not belong to an IP subnetwork containing said packet gateway, said managing unit controls transmission of an IP address of said packet gateway to a router having a home agent function on said IP network.

11. The packet gateway of claim 9, wherein said memory further stores the IP address received by said routing unit from another packet gateway and the IP address of said another packet gateway in a corresponding manner to one another, and wherein, in a case where a destination of an IP packet received by said routing unit or said interface unit is stored in said memory so as to correspond to the IP address of another packet gateway, said managing unit controls transmission of the received IP packet via said routing unit to said another packet gateway.

12. A location information managing method in a communication system which includes a mobile communication system including at least one device for configuring a radio cell and transmitting/receiving a signal to/from a mobile terminal, a mobile switching center connected to each device, a location register connected to said mobile switching center for managing location information of the mobile terminal, and a packet gateway connected to said mobile communication system and directly connected to an IP network which is separate from said mobile communication system, said method comprising the steps of:

notifying, by said mobile switching center, said location register of an IP address possessed by the mobile terminal and location information indicating a service area of said at least one device which is responsive to said mobile terminal, said IP address being received from said mobile terminal, wherein said packet gateway is connected to said location register and to each device;

notifying, by said location register, said packet gateway of said IP address and said location information; and managing, by said packet gateway, said IP address and said location information in a correspondence manner to one another.

13. A location information managing method in a communication system which includes a mobile communication system including at least one device for configuring a radio cell and transmitting/receiving a signal to/from a mobile terminal, a mobile switching center connected to each device, a location register connected to said mobile switching center for managing location information of the mobile terminal, and a packet gateway connected to said mobile communication system and an IP network outside said mobile communication system, said method comprising the steps of:

notifying, by said mobile switching center, said location register of an IP address possessed by the mobile terminal and location information indicating a service area of said at least one device which is responsive to said mobile terminal, said IP address being received from said mobile terminal, wherein said packet gateway is connected to said location register and to each device;

notifying, by said location register, said packet gateway of said IP address and said location information;

managing, by said packet gateway, said IP address and said location information in a correspondence manner to one another; and in a case wherein said IP address does not belong to an IP subnetwork containing said packet gateway, said at least one device connected to said packet gateway and a mobile terminal which transmits/receives a signal to/from said device, notifying, by said packet gateway, another packet gateway contained in another IP subnetwork to which said IP address belongs of said IP address and an IP address of said packet gateway.

14. The method of claim 13, further comprising the steps of:

receiving, by said packet gateway from another packet gateway connected to said IP network, the IP address which is managed by said another packet gateway to correspond to location information and the IP address of said another packet gateway; and managing said IP address and the IP address of said another packet gateway in a correspondence manner to one another.

15. A location information notifying method in a communication system which includes a mobile communication system including at least one device for configuring a radio cell and transmitting/receiving a signal to/from a mobile terminal, a mobile switching center connected to each device, a location register connected to said mobile switching center for managing location information of the mobile terminal, and a packet gateway connected to said mobile communication system and directly connected to an IP network separate from said mobile communication system, said method comprising the steps of:

notifying, by said mobile switching center, said location register of identification information of the mobile terminal and of location information indicating a server area of the device which is responsive to a mobile terminal, wherein said packet gateway is connected to said location register and each device;

notifying, by said location register, a home location register of said mobile terminal of said identification information of said mobile terminal, and obtaining from said home location register an IP address corresponding to said identification information; and notifying, by said location register, said packet gateway of said location information and said IP address thus obtained.

* * * * *